(12) United States Patent
Dinan et al.

(10) Patent No.: US 8,086,249 B1
(45) Date of Patent: Dec. 27, 2011

(54) RANGING OF WIRELESS COMMUNICATION NETWORKS WITH DISTANT WIRELESS LINKS

(75) Inventors: Esmail Hejazi Dinan, Herndon, VA (US); Saied Kazeminejad, Herndon, VA (US)

(73) Assignee: Clearwire IP Holdings, LLC, Bellevue, WA (US)

( * ) Notice: Subject to any disclaimer, the term of this patent is extended or adjusted under 35 U.S.C. 154(b) by 793 days.

(21) Appl. No.: 12/197,597

(22) Filed: Aug. 25, 2008

(51) Int. Cl.
*H04W 24/00* (2009.01)
(52) U.S. Cl. ............... 455/456.1; 455/456.5; 455/456.6; 455/423; 455/502; 370/350
(58) Field of Classification Search ............... 455/456.1, 455/456.5, 456.6, 423, 502; 370/350
See application file for complete search history.

(56) References Cited

U.S. PATENT DOCUMENTS

| 2003/0109264 A1* | 6/2003 | Syrjarinne et al. | 455/456 |
| 2003/0232620 A1* | 12/2003 | Runkle et al. | 455/423 |

* cited by examiner

*Primary Examiner* — Nick Corsaro
*Assistant Examiner* — Kathy Wang-Hurst
(74) *Attorney, Agent, or Firm* — O'Brien Jones, PLLC

(57) ABSTRACT

A method of operating a communication system is disclosed. The method includes receiving a first location information related to a geographic location of a wireless communication device and a second location information related to a geographic location of an access node, processing the first location information and the second location information to determine a distance between the wireless communication device and the access node, processing the distance to determine a first delay metric, wherein the first delay metric indicates a first time delay associated with a wireless link between the access node and the wireless communication device, and processing the first delay metric to determine if the first delay metric exceeds a threshold delay. If the first delay metric exceeds the threshold delay, processing the first delay metric and a protocol timing period to determine a second delay metric, wherein the second delay metric indicates a second time delay less than the protocol timing period, processing at least one of the protocol timing periods to add to the second delay metric to determine a third delay metric, wherein the third delay metric comprises the second delay metric and the at least one of the protocol timing periods. The method also includes timing communications between the access node and the wireless communication device over the wireless link based on the third delay metric.

20 Claims, 11 Drawing Sheets

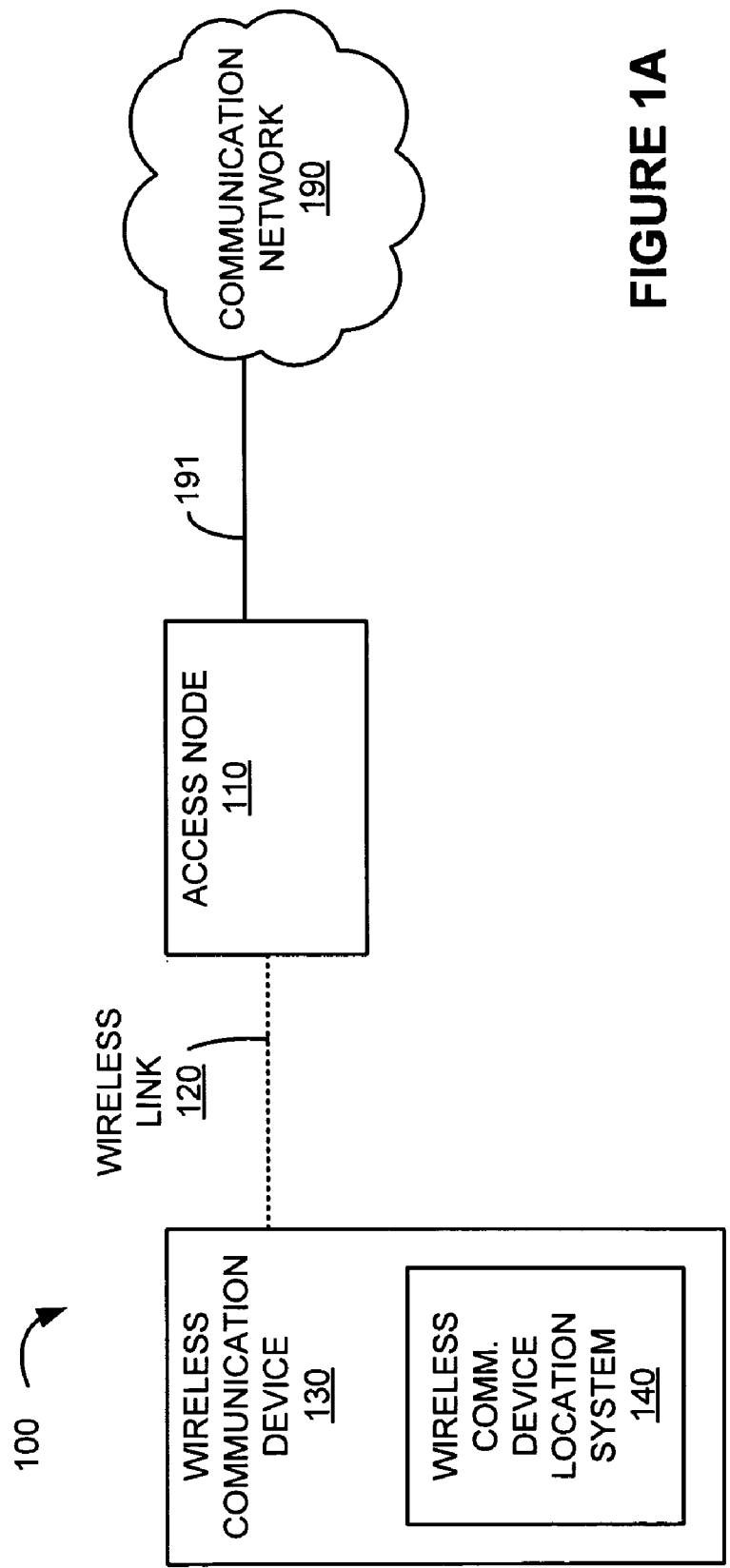

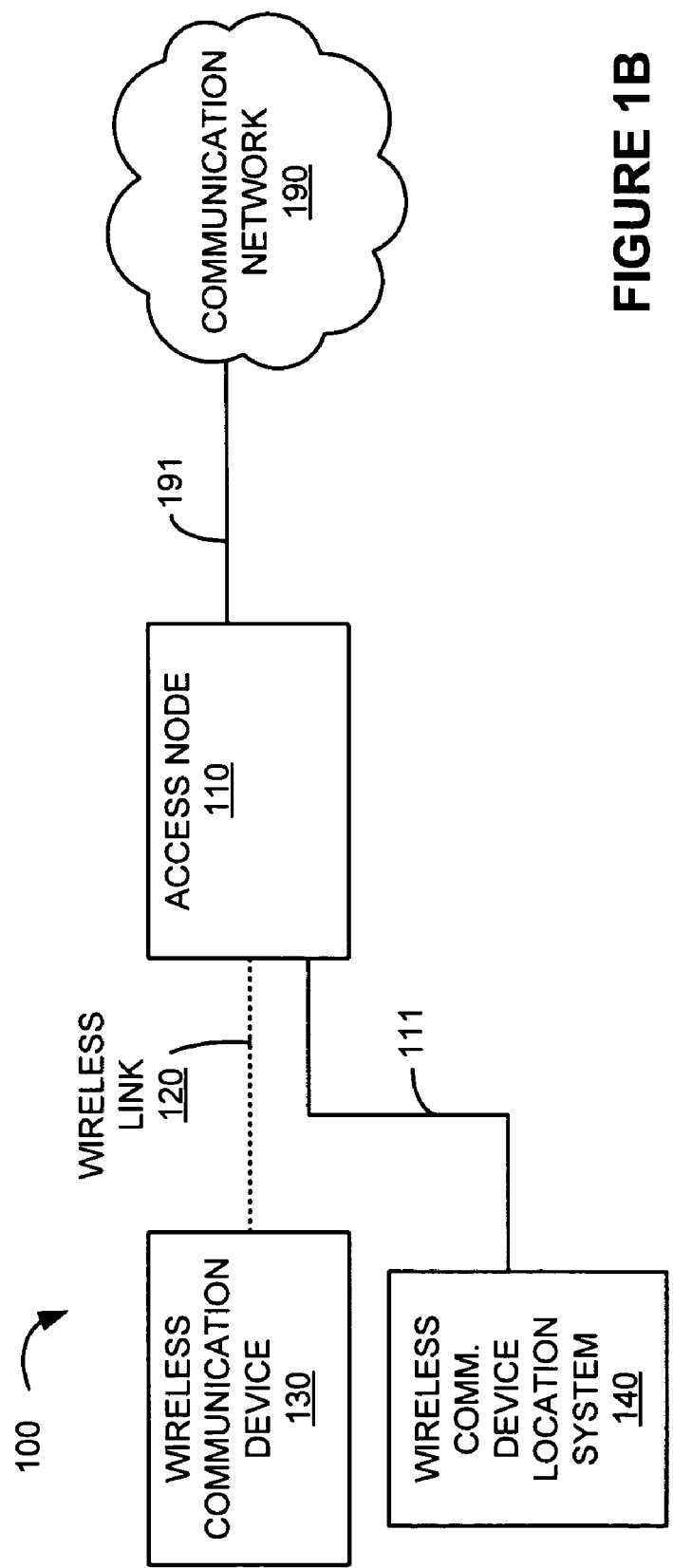

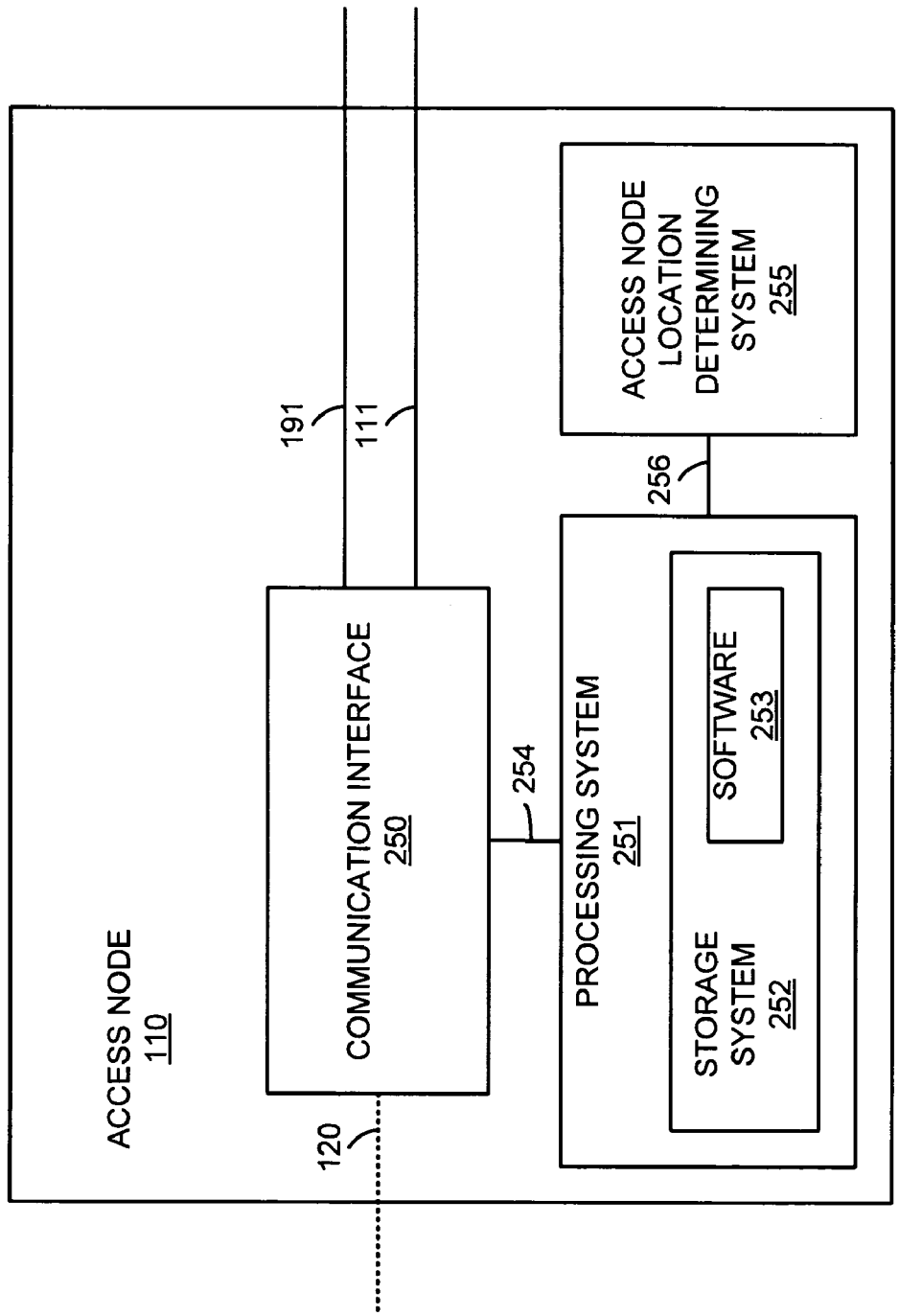

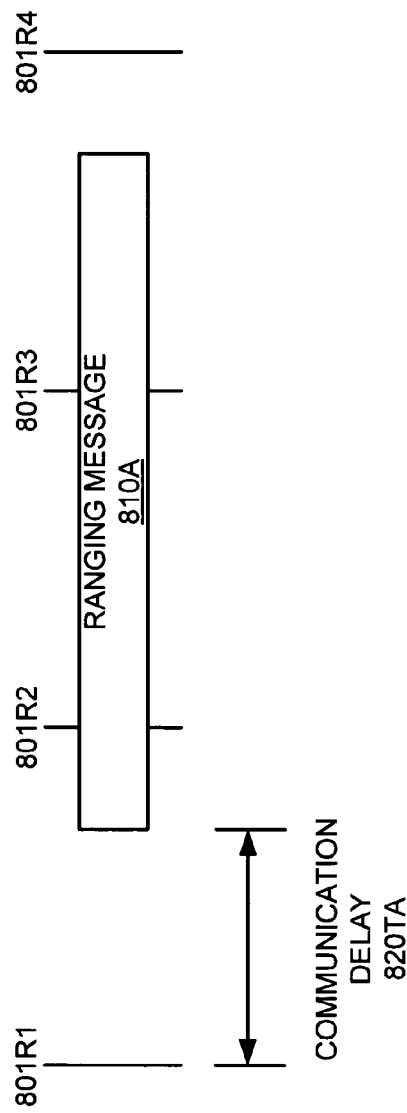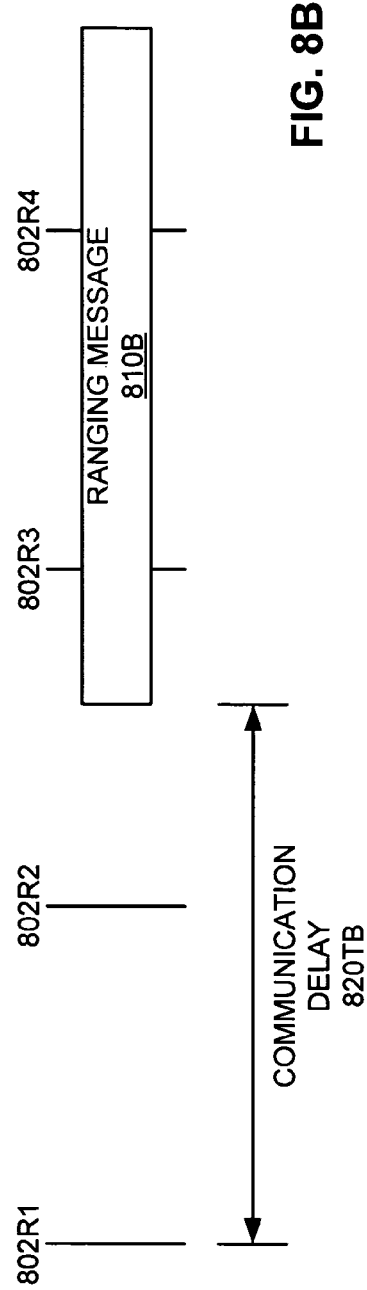

US 8,086,249 B1

RANGING OF WIRELESS COMMUNICATION NETWORKS WITH DISTANT WIRELESS LINKS

TECHNICAL BACKGROUND

Wireless communication networks typically include wireless communication devices which, via a communication system, communicate with further communication networks and equipment. The communication system typically includes antennas, base transceiver stations, access nodes, and other associated equipment to route communications over wireless links from the wireless communication devices to other communication networks, equipment, and destinations. Base transceiver stations each service wireless communication devices over small geographic areas, or cells.

However, in some wireless communication networks, base transceiver stations are needed to service larger geographic areas. Examples of such base transceiver stations include boomer cells, or base transceiver stations intended to service many more wireless communication devices over a large geographic area. In many of these examples, it is desired to have the base transceiver station equipment communicate over extended distances to many wireless communication devices over wireless links.

In such networks, the large distances that can exist between the wireless communication devices and the base transceiver station equipment may lead to longer-than-anticipated communication transmission delays. These delays cause problems with existing communication equipment and protocols, leading to interference, collisions, or other malfunctions of wireless communications through the wireless communication networks.

Overview

A method of operating a communication system is disclosed. The method includes receiving a first location information related to a geographic location of a wireless communication device and a second location information related to a geographic location of an access node, processing the first location information and the second location information to determine a distance between the wireless communication device and the access node, processing the distance to determine a first delay metric, wherein the first delay metric indicates a first time delay associated with a wireless link between the access node and the wireless communication device, and processing the first delay metric to determine if the first delay metric exceeds a threshold delay. If the first delay metric exceeds the threshold delay, processing the first delay metric and a protocol timing period to determine a second delay metric, wherein the second delay metric indicates a second time delay less than the protocol timing period, processing at least one of the protocol timing periods to add to the second delay metric to determine a third delay metric, wherein the third delay metric comprises the second delay metric and the at least one of the protocol timing periods. The method also includes timing communications between the access node and the wireless communication device over the wireless link based on the third delay metric.

A communication system is also disclosed, which includes a location system configured to determine a first location information related to a geographic location of a wireless communication device and transfer the first location information. The communication system also includes an access node configured to receive the first location information and determine a second location information related to a geographic location of the access node, process the first location information and the second location information to determine a distance between the wireless communication device and the access node, process the distance to determine a first delay metric, wherein the first delay metric indicates a first time delay associated with a wireless link between the access node and the wireless communication device, and process the first delay metric to determine if the first delay metric exceeds a threshold delay. If the first delay metric exceeds the threshold delay, the access node is configured to process the first delay metric and a protocol timing period to determine a second delay metric, wherein the second delay metric indicates a second time delay less than the protocol timing period, process at least one of the protocol timing periods to add to the second delay metric to determine a third delay metric, wherein the third delay metric comprises the second delay metric and the at least one of the protocol timing periods. The access node is also configured to time communications between the access node and the wireless communication device over the wireless link based on the third delay metric.

A communication device for a communication system is also disclosed, which includes a communication interface configured to receive a first location information related to a geographic location of the communication device and a second location information related to a geographic location of another communication device. The communication device also includes a processing system configured to process the first information and the second information to determine a distance between the communication device and the other communication device, process the distance to determine a first delay metric, wherein the first delay metric indicates a first time delay associated with a wireless link between the communication device and the other communication device, and process the first delay metric to determine if the first delay metric exceeds a threshold delay. If the first delay metric exceeds the threshold delay, the processing system is configured to process the first delay metric and a protocol timing period to determine a second delay metric, wherein the second delay metric indicates a second time delay less than the protocol timing period, and process at least one of the protocol timing periods to add to the second delay metric to determine a third delay metric, wherein the third delay metric comprises the second delay metric and the at least one of the protocol timing periods. The communication interface is also configured to time communications between the communication device and the other communication device over the wireless link based on the third delay metric.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 1A and 1B are system diagrams illustrating communication systems.

FIG. 2 is a block diagram illustrating an access node.

FIGS. 8A and 8B are graphical representations of ranging packets in a communication system.

DETAILED DESCRIPTION

Figure 3:
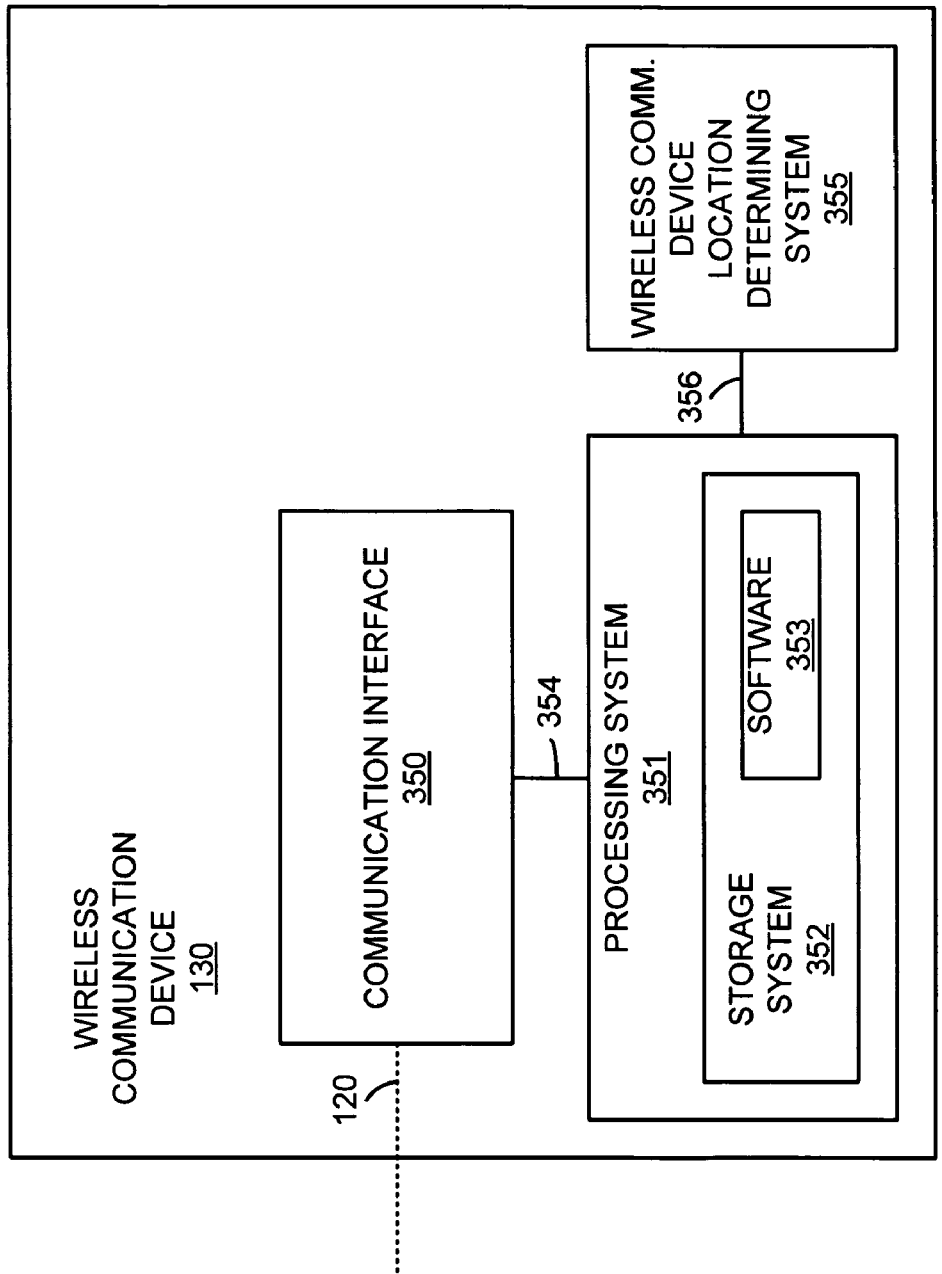
FIG. 3 is a block diagram illustrating a wireless communication device.

FIGS. 1A and 1B are system diagrams illustrating communication systems. FIG. 1A shows an example of communication system 100. FIG. 1B shows another example of communication system 100. FIGS. 1A and 1B include wireless communication device 130, access node 110, and communication network 190. Wireless communication device 130 and access node 110 communicate over wireless link 120. Access node 110 and communication network 190 communicate over link 191.

In FIG. 1A, wireless communication device 130 includes wireless communication device location system 140. Alternatively, in FIG. 1B, communication system 100 includes wireless communication device location system 140, where wireless communication device location system 140 and access node 110 communicate over link 111.

Access node 110 includes communication and processing equipment to communicate with and control wireless communication device 130. Examples of access node 110 include wireless base transceiver stations (BTS), base station controllers, access service networks (ASN), radio node controllers (RNC), mobile switching centers (MSC), call processing equipment, wireless access points, telephone switches, Internet routers, and network gateways, as well as other type of communication equipment, including combinations thereof. In other examples, access node 110 includes computer systems, processing systems, or other processing equipment, including combinations thereof.

Wireless communication device 130 includes equipment capable of communicating over wireless link 120. Examples of wireless communication device 130 include a subscriber station (SS), customer premises equipment (CPE), mobile station, telephone, transceiver, computer, digital assistant, smart phone, Internet appliance, or other wireless communication apparatus, including combinations thereof. Although one wireless communication device 130 is shown in FIGS. 1A and 1B, it should be understood that in other examples a different number of wireless communication devices could be included in communication system 100.

Wireless communication device location system 140 includes equipment capable of determining an indicator of a geographic location of wireless communication device 130. Examples of wireless communication device location system 140 include a global-positioning system (GPS) receiver, a terrestrial position determining equipment (PDE) system, a triangulation-based location system, an emergency services location procedure system, or some other type of location-determining system, including combinations thereof.

Communication network 190 comprises routers, switches, gateways, servers, or some other type of communication network or equipment—including combinations thereof. Communication network 190 may also comprise further communication systems, an Internet network, wireless networks, telephony networks, optical networks, enterprise networks, local area networks, or some other type of communication network or communication equipment, including combinations thereof.

Wireless link 120 uses air, space, or some other wireless transport path. Wireless link could use various protocols, such as worldwide interoperability for microwave access (WiMAX), long term evolution (LTE), time-division duplex (TDD), orthogonal frequency-division multiplexing (OFDM) or orthogonal frequency division multiplexing access (OFDMA), wireless fidelity (WiFi), code division multiple access (CDMA), time division multiple access (TDMA), global system for mobile communications (GSM), or some other communication format, including combinations or variations thereof.

Links 111 and 191 use various communication media, such as air, space, metal, optical fiber, or some other signal propagation path—including combinations thereof. Links 111 and 191 could be wired or wireless and use various protocols, such as Internet protocol (IP), local-area network (LAN), optical networking, hybrid fiber coax (HFC), telephony, T1, wireless fidelity (WiFi), code division multiple access (CDMA), time division multiple access (TDMA), Global System for Mobile communications (GSM), worldwide interoperability for microwave access (WiMAX), Long Term Evolution (LTE), Internet, or some other communication format—including combinations or variations thereof. Links 111 and 191 could be direct links or might include various equipment, intermediate components, systems, and networks.

FIG. 2 illustrates a block diagram of access node 110, as found in FIGS. 1A/1B. Access node 110 includes communication interface 250, processing system 251, and access node location determining system 255. Processing system 251 includes storage system 252. Storage system 252 stores software 253, which includes data to be retrieved and instructions to be executed by processing system 251 to perform the various functions described herein. Processing system 251 is communicatively linked to communication interface 250 by link 254. Processing system 251 is communicatively linked to access node location determining system 255 by link 256. Access node 110 may be distributed among multiple devices that together form elements 250-256. In some examples, access node location determining system 255 is communicatively linked to communication interface 250.

Communication interface 250 comprises a base transceiver station, antennas, transceivers, circuitry, as well as other types of communication equipment, including combinations thereof.

Access node location determining system 255 includes equipment capable of determining an indicator of a geographic location of access node 110. Examples of access node location determining system 255 include a global-positioning system (GPS) receiver, a terrestrial position determining equipment (PDE) system, a triangulation-based location system, an emergency services location procedure system, or some other type of location determining system, including combinations thereof. Other examples of access node location determining system 255 include merely an interface configured to communicate with external equipment capable of determining an indicator of a geographic location of access node 110, where the indicator would then be received by access node location determining system 255. In another example, access node location determining system 225 may be digital storage including the indicator of the geographic location of access node 110.

Processing system 251 retrieves and executes software 253 from storage system 252. Processing system 251 could incorporate a computer microprocessor, logic circuit, or some other processing device, and may be distributed among multiple processing devices. In some examples, processing system 251 is located within the same equipment in which communication interface 250 or access node location determining system 255 are located. Storage system 252 could include a computer-readable medium such as a disk, tape, integrated circuit, server, or some other memory device, and also may be distributed among multiple memory devices. Software 253 may include an operating system, logs, utilities, drivers, networking software, and other software typically loaded onto a computer system. Software 253 could contain an application program, firmware, or some other form of computer-readable processing instructions. When executed by processing system 251, software 253 directs processing system 251 to operate as described herein.

Links 254 and 256 comprise physical, logical, or virtual communication links capable of communicating service control signals and communications, along with other information. In some examples, links 254 and 256 are encapsulated within the elements of communication interface 250, processing system 260, or access node location determining system 255, and may be a software or logical link. In other examples, links 254 and 256 uses various communication media, such as air, space, metal, optical fiber, or some other signal propagation path—including combinations thereof. Links 254 and 256 could be wired or wireless and use various protocols or communication formats including those described for links 111 or 191—including combinations or variations thereof. Links 254 and 256 could be direct links or might include various equipment, intermediate components, systems, and networks.

FIG. 3 illustrates a block diagram of wireless communication device 130 as found in FIG. 1. Wireless communication device 130 includes communication interface 350, processing system 351, and wireless communication device location determining system 355. Processing system 351 includes storage system 352. Storage system 352 stores software 353, which includes data to be retrieved and instructions to be executed by processing system 351 to perform the various functions described herein. Processing system 351 is communicatively linked to communication interface 350 by link 354. Processing system 351 is communicatively linked to wireless communication device location determining system 355 by link 356. Wireless communication device 130 may be distributed among multiple devices that together form elements 350-356. In some examples, wireless communication device location determining system 355 is communicatively linked to communication interface 350.

Communication interface 350 comprises antennas, transceivers, circuitry, as well as other types of communication components, including combinations thereof.

Wireless communication device location determining system 355 includes equipment capable of determining an indicator of a geographic location of wireless communication device 130. Examples of wireless communication device location system 355 include a global-positioning system (GPS) receiver, a terrestrial position determining equipment (PDE) system, a triangulation-based location system, an emergency services location procedure system, or some other type of location determining system, including combinations thereof. Other examples of wireless communication device location determining system 355 include merely an interface configured to communicate with external equipment capable of determining an indicator of a geographic location of wireless communication device 130, where the indicator would then be received by wireless communication device location determining system 355.

Processing system 351 retrieves and executes software 353 from storage system 352. Processing system 351 could incorporate a computer microprocessor, logic circuit, or some other processing device, and may be distributed among multiple processing devices. In some examples, processing system 351 is located within the same equipment in which communication interface 350 or wireless communication device location determining system 355 are located. Storage system 352 could include a computer-readable medium such as a disk, tape, integrated circuit, server, or some other memory device, and also may be distributed among multiple memory devices. Software 353 may include an operating system, logs, utilities, drivers, networking software, and other software typically loaded onto a computer system. Software 353 could contain an application program, firmware, or some other form of computer-readable processing instructions. When executed by processing system 351, software 353 directs processing system 351 to operate as described herein.

Links 354 and 356 comprise physical, logical, or virtual communication links capable of communicating control signals and communications, along with other information. In some examples, links 354 and 356 are encapsulated within the elements of communication interface 350, processing system 351, or wireless communication device location determining system 355 and may be a software or logical link. In other examples, links 354 and 356 use various communication media, such as air, space, metal, optical fiber, or some other signal propagation path, including combinations thereof. Links 354 and 356 could be wired or wireless and use various protocols or communication formats as described for links 111 or 191, including combinations or variations thereof. Links 354 and 356 could be direct links or might include various equipment, intermediate components, systems, and networks.

Figure 4:
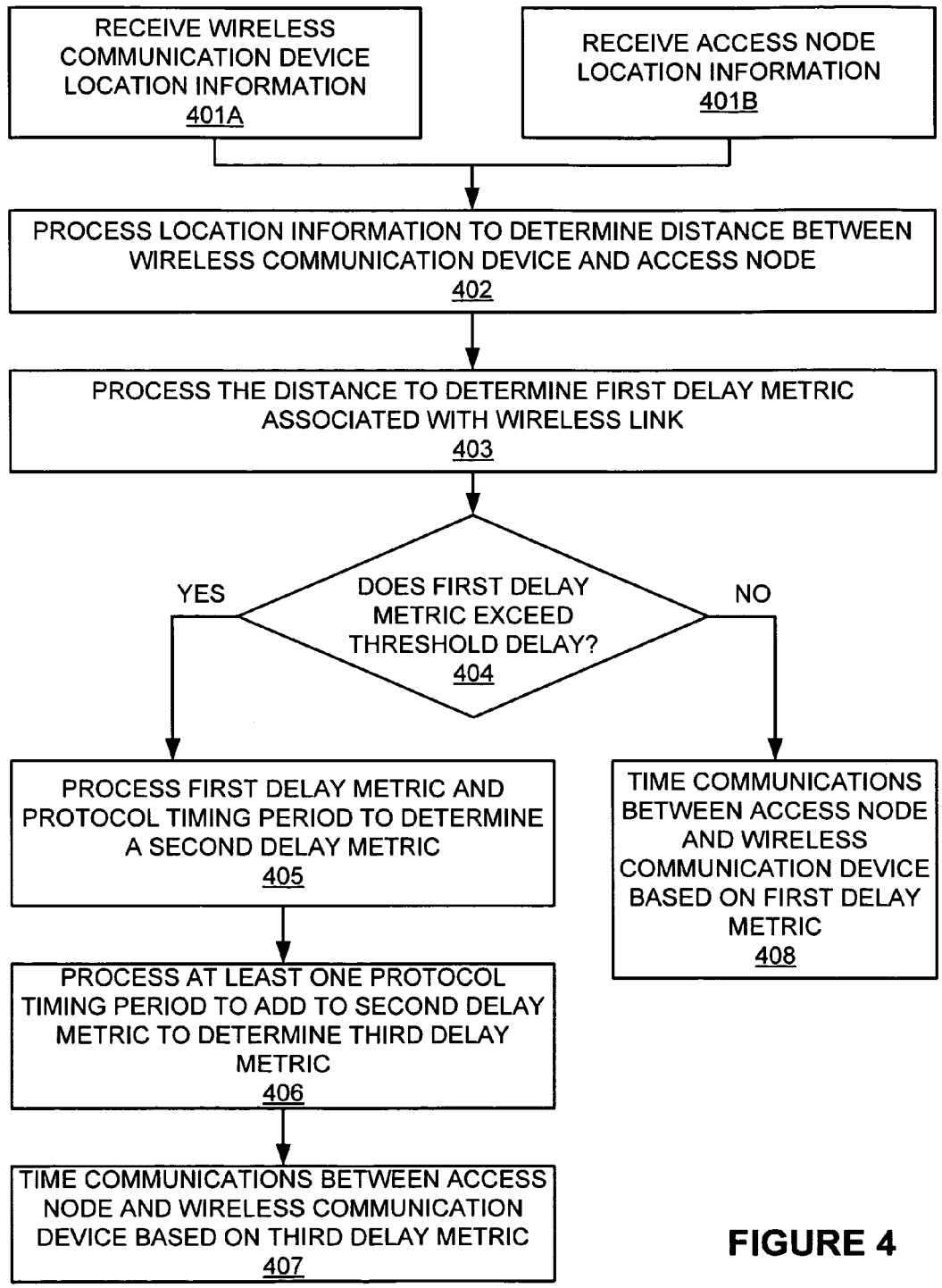
FIG. 4 is a flow diagram illustrating a method of operation of a communication system.

FIG. 4 is a flow diagram that illustrates a method of operation of communication system 100, as shown in FIG. 1. The operations of the method shown in FIG. 4 are indicated herein parenthetically.

In FIG. 4, location information relating to a geographic location of wireless communication device 130 is received (401A) in communication system 100. Depending upon the configuration of communication system 100, the location information relating to the geographic location of wireless communication device 130 could be received in either wireless communication device 130 or access node 110. The location information relating to the geographic location of wireless communication device 130 is determined by wireless communication device location system 140. In some examples, such as shown in FIG. 1A, wireless communication device location system 140 is located in wireless communication device 130. Wireless communication device 130 could be configured to then transfer the location information determined by wireless communication device location system 140 over wireless link 120. In other examples, such as shown in FIG. 1B, wireless communication device location system 140 is separate from wireless communication device 130. The location information relating to the geographic location of wireless communication device 130 could then be transferred by wireless communication device location system 140 over link 111, and received by access node 110.

Location information relating to a geographic location of access node 110 is also received (401B) in communication system 100. Access node 110 could receive this location information from a global-positioning system (GPS)

receiver, a terrestrial position determining equipment (PDE) system, a triangulation-based location system, an emergency services location procedure system, or some other type of location determining system, including combinations thereof. In some examples, the location information relating to the geographic location of access node 110 could be determined by access node 110. In other examples, the location information relating to the geographic location of access node 110 could be transferred over wireless link 120 once determined by access node 110. In examples where the geographic location of access node 110 does not change, the location information relating to the geographic location of access node 110 could be predetermined and stored by access node 110.

Communication system 100 processes (402) the location information of access node 110 and wireless communication device 130 to determine a distance between access node 110 and wireless communication device 130. This processing could occur in access node 110 in some examples, or in wireless communication device 130 in other examples. In examples where the location information is received in wireless communication device 130, the processing could occur in wireless communication device 130. In other examples where the location information is received in access node 110, the processing could occur in access node 110. Other examples may include other processing locations in communication system 100.

The distance is then processed (403) to determine a first delay metric associated with wireless link 120. Wireless signals transferred over wireless link 120 typically follow paths through air, space, or some other wireless transport medium which can be estimated or approximated. The distance can be processed to determine a first delay metric, where the first delay metric indicates a first time delay associated with wireless link 120. This first time delay is correlated to a transit time, communications delay, or propagation delay of communications over wireless link 120.

The first delay metric is processed (404) to determine if the first delay metric exceeds a threshold delay. The threshold delay could be determined based upon many different factors, depending upon the intentions of the operator of communication network 100. For example, the threshold delay could indicate a maximum protocol timing period allowed by the provisions of a particular communication protocol. In other examples, the threshold delay could be a maximum protocol timing period while accounting for an additional tolerance or margin factor. The threshold delay could also be representative of a physical distance, as correlated to a communication delay over a wireless link, such as a wireless coverage radius of access node 110, a communication range of wireless communication device 130, or other phenomena. A representation of a coverage area of access node 110 is further illustrated in FIG. 5.

If the first delay metric does not exceed the threshold delay, communications between access node 110 and wireless communication device 130 over wireless link 120 are timed (408) based on the first delay metric. In some examples, including those where access node 110 processes the timing delays, a message comprising the first delay metric could be transferred over wireless link 120. Wireless communication device 130 could receive this message and time its communications with access node 110 based upon the first delay metric. In other examples, access node 110 could time communications between access node 110 and wireless communication device 130. While in other examples, wireless communication device 130 could determine the first delay metric and time communications with access node 110 based on this first delay metric.

However, if the first delay metric exceeds the threshold delay, the first delay metric and a protocol timing period are processed (405) to determine a second delay metric, where the second delay metric indicates a second time delay less than the protocol timing period. At least one of the protocol timing periods is processed (406) to add to the second delay metric to determine a third delay metric, wherein the third delay metric comprises the second delay metric and at least one of the protocol timing periods.

In many example communication protocols, a maximum time delay provision is allowed between two points in a communication link, and can be a limited by the particular communication protocol employed, among other factors. This time delay provision can limit the maximum distance, interconnect quality, number of repeaters, number and delay of interconnecting equipment, or operating speed of two points in a communication link.

Regarding the timing delay provisions of some example wireless communication protocols, communications between access nodes and wireless communication devices can include framed communications. In WiMAX communications examples, these frames could include OFDMA symbols, which include provisions for timing offsets of symbol periods of communications with wireless communication devices. In some WiMAX examples, such as time-division duplexing (TDD), multiple wireless communication devices communicating with an access node share the same communication channel, and timing offsets play an important role in the communications. Other wireless communication protocols could have similar timing limitations. The timing offsets indicate to wireless communication devices when to transmit communications, and likewise can indicate to access nodes when to expect receipt of communications from wireless communication devices. If these timing delays are incorrect, for example when many wireless communication devices are communicating with an access node, then interferences, collisions, or other maladies of the communications could result.

Wireless communication protocols, in many typical examples, accommodate only limited timing offset adjustment provisions. The provisions for timing offsets in such examples can reach a maximum allowable value if the transmission delay between an access node and a wireless communication device becomes too large. This transmission delay can become too large, for example, if there are long component delays, cable lengths, or wireless transmission distances over which the communications are transferred.

In examples where the transmission delay becomes too large to be accommodated by the limitations of the communication protocol, the third delay metric could include both a timing offset within the individual elements of the communications as well as a delay in total communications In some examples, the timing offset of the individual elements, referred to above as the second delay metric, includes a timing offset to delay transmission of the elements by time periods less than timing periods of the communication protocol, which could reach a maximum allowable timing offset dictated by the communications protocol employed. The delay in total communications could include at least one protocol timing period, such as a symbol or frame, by which to adjust the timing in communications. This delay in total communications could indicate a delay in communications, or a delayed expectation or receipt of communications. A further discussion of the protocol timing offset is found below in FIGS. 8A/8B within the context of a ranging process of a wireless communication protocol.

Once the third delay metric has been determined, communication system 100 times (407) communications between access node 110 and wireless communication device 130 based upon the third delay metric. These communications could include timing offsets and possibly further initialization communications, or could include user or subscriber communications.

During operation of communication system 100, communications are exchanged between wireless communication device 130 and access node 110. During this communications exchange, communication system 100 is desired to provide reliable communications which have proper timing and synchronization. Advantageously, by utilizing a method of operation as described herein, communication systems with large delays and long wireless links that exceed the limitations of the communication protocols can communicate effectively. This allows wireless communication devices to be more remotely located or communicate over wireless links with larger delays than acceptable by the limitations of certain communication protocols. Also, by way of advantage, when many wireless communication devices are communicating with an access node, interferences, collisions, or other malfunctions of the communications are reduced or prevented.

Figure 5:
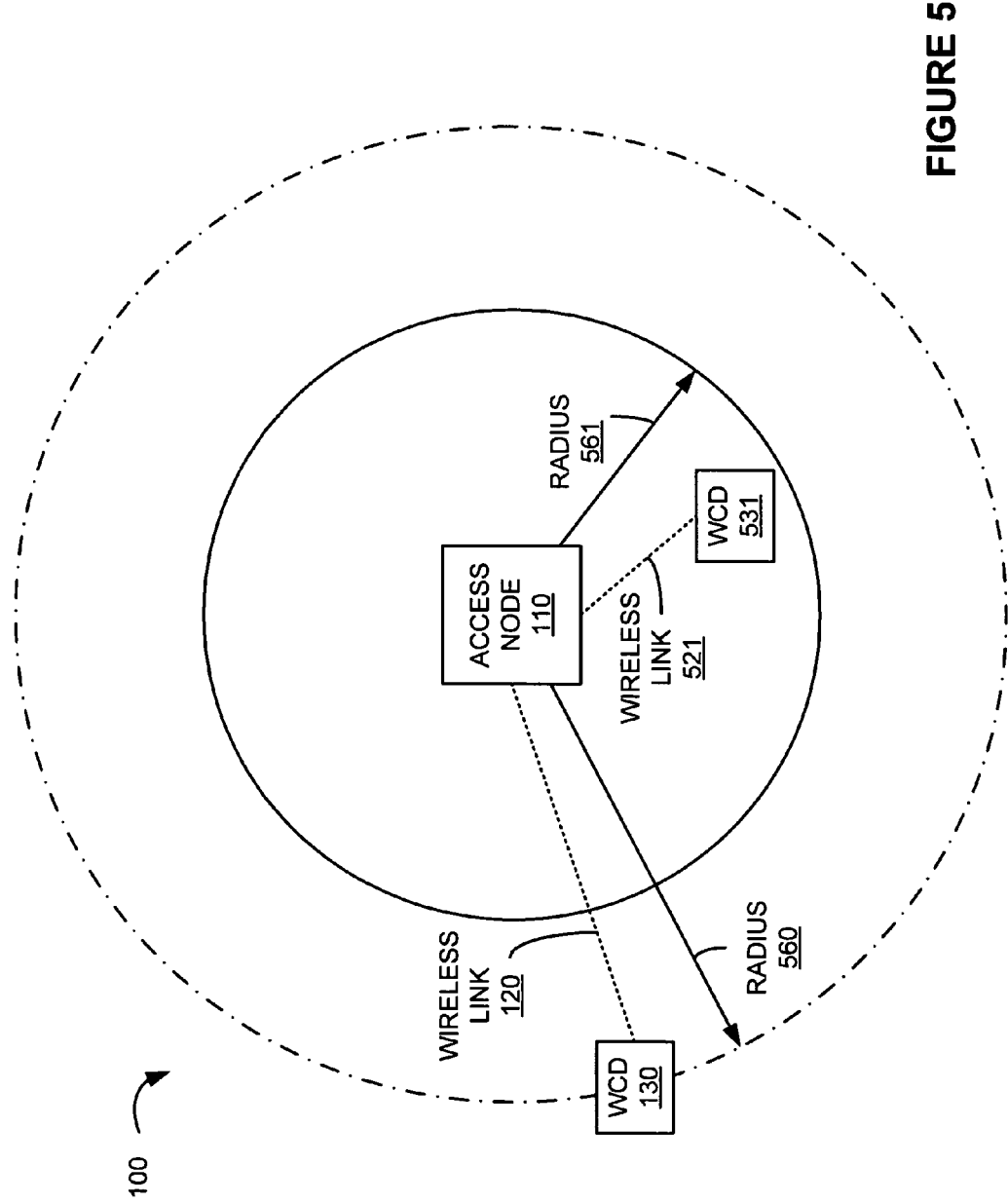
FIG. 5 is an overhead visualization of a communication system.

FIG. 5 illustrates an overhead representation of communication system 100, as found in FIG. 1. FIG. 5 includes wireless communication device (WCD) 130 and access node 110, both also shown in FIG. 1, as well as wireless communication device (WCD) 531. WCD 531 is similar to WCD 130, but shown to illustrate further examples of the operation of communication system 100. WCD 531 and access node 110 communicate over wireless link 521. Wireless link 521 is similar to wireless link 120, but shown to illustrate further examples of the operation of communication system 100. Communication network 190 and link 191 are not shown in FIG. 5 for clarity.

In FIG. 5, wireless communications could be transmitted and received by access node 110 as well as by WCD 130 and WCD 531. Access node 110 has a limited geographic range over which it can communicate with WCD 130 and WCD 531. This limited range could be a function of the signal strength of wireless access node 110 or WCD 130 and WCD 531, predetermined by the operator of communication system 100, a limitation of the communication protocol employed over wireless links 120 and 521, or some other limitations.

The limited range over which access node 110 can communicate with wireless communication devices is indicated by radius 561. WCD 531 is shown located a distance from access node 110 which is within radius 561. WCD 130 is shown located a distance of radius 560 from access node 110. Radius 560 represents a distance which is farther away from access node 110 than radius 561. Access node 110 and WCD 130 would not be able to normally communicate effectively, as too great a distance separates the two. This distance can be correlated to a transit time, communications delay, or propagation delay of communications, as discussed above, and could exceed the timing provisions of the communication protocol employed.

As discussed herein, communication protocols in many examples have limited timing offset provisions. If the limitations of these timing offset provisions are exceeded, then communications may be disrupted, or may not be successful. Advantageously, by utilizing a method of operation as described herein, communication systems with large delays or long wireless links, such as those greater than that represented by radius 561, which then exceed the limitations of the communication protocol employed, can communicate effectively. This allows wireless communication devices to be more remotely located or communicate over wireless links with larger delays than acceptable by the limitations of certain communication protocols. Also, by way of advantage, when many wireless communication devices are communicating with an access node, interferences, collisions, or other malfunctions of the communications are reduced or prevented.

Figure 6:
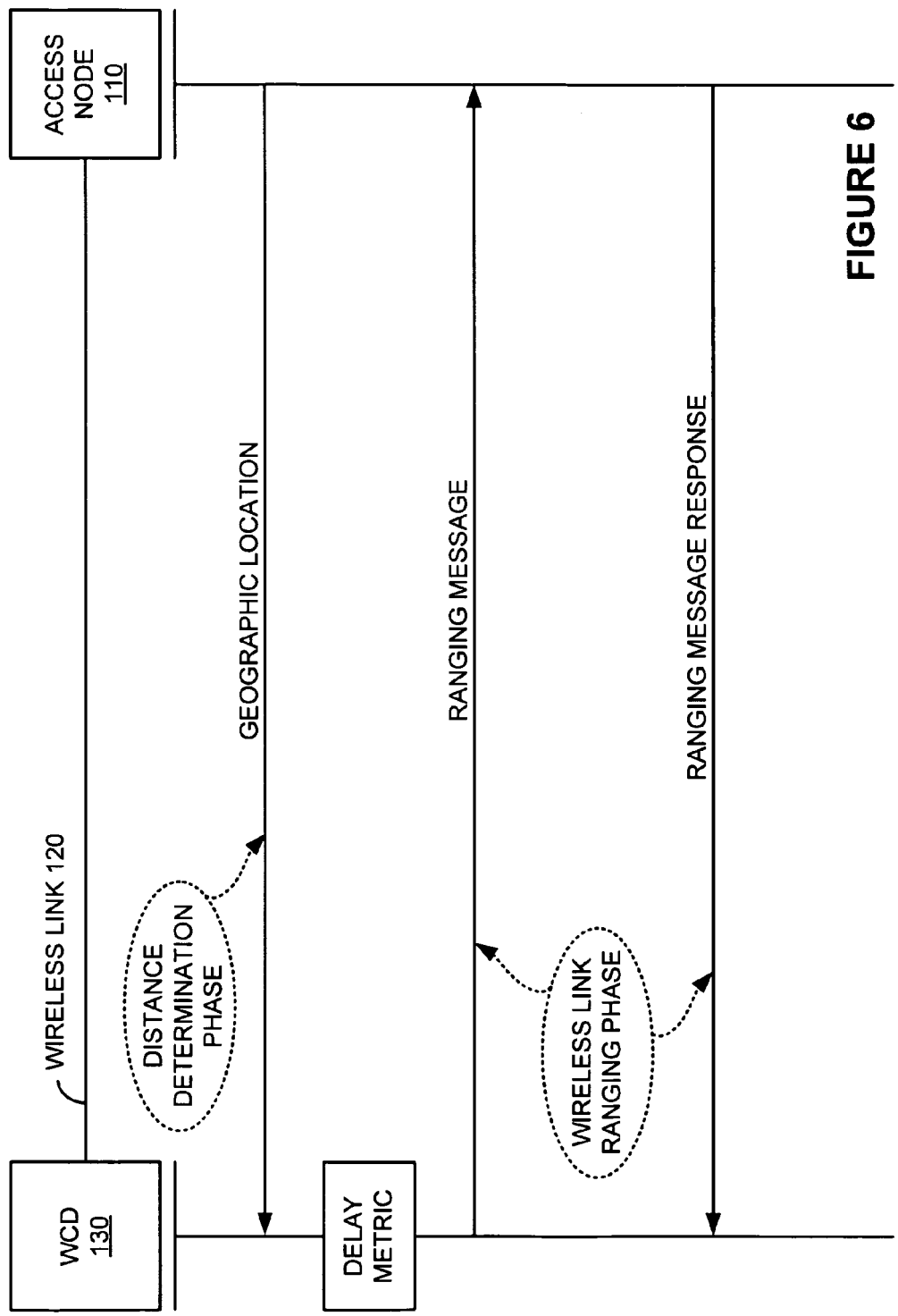
FIG. 6 is a sequence diagram illustrating a method of operation of a communication system.

FIG. 6 is a sequence diagram that shows an example sequence of operation of communication system 100, as found in FIG. 1. In FIG. 6, two phases are shown: a distance determination phase and a wireless link ranging phase. In this example, wireless communication device (WCD) 130 determines the proper timing for communications over wireless link 120.

The distance determination phase includes a first communication group exchanged between WCD 130 and access node 110. In this example, an indicator of the geographic location of access node 110 is transferred to WCD 130 over wireless link 120. Location information relating to a geographic location of access node 110 is then received by WCD 130. Access node 110 could determine this location information from a global-positioning system (GPS), a terrestrial position determining equipment (PDE) system, a triangulation-based location system, an emergency services location procedure system, or some other type of location determining system, including combinations thereof. In examples in which the geographic location of access node 110 does not change, the location information relating to the geographic location of access node 110 could be predetermined and stored by access node 110 for later access. This indicator of the geographic location of access node 110 could be broadcast so that all wireless communication devices desiring to establish communications with access node 110 can receive it. In some examples, wireless link 120 further comprises a pilot signal, pilot beacon, or a beacon signal, and the indicator of the geographic location of access node 110 is transferred over the pilot signal, pilot beacon, or beacon signal broadcast by access node 110. In other examples, the indicator of the geographic location of access node 110 could be transferred after being requested by WCD 130.

Location information relating to a geographic location of WCD 130 is also received by WCD 130. Depending upon the configuration of WCD 130, the location information relating to the geographic location of WCD 130 could be received first in either WCD 130 or access node 110. The location information relating to the geographic location of WCD 130 is determined by wireless communication device location system 140.

In some examples, such as shown in FIG. 1A, wireless communication device location system 140 is located in WCD 130, and the location information relating to the geographic location of WCD 130 would not need to be transferred over wireless link 120. In other examples, as shown in FIG. 1B, wireless communication device location system 140 is separate from WCD 130. The location information relating to the geographic location of WCD 130 could then be transferred by wireless communication device location system 140 over link 111, and received by access node 110 and further transferred over wireless link 120. WCD 130 could then receive this location information.

WCD 130 then processes the location information of access node 110 and WCD 130 to determine a distance between access node 110 and WCD 130. WCD 130 processes the distance to determine a first delay metric associated with wireless link 120. Wireless signals transferred over wireless link 120 typically follow paths through air, space, or some other wireless transport medium which can be estimated or approximated. The distance can be processed to determine a first delay metric, where the first delay metric indicates a first time delay associated with wireless link 120. This first time delay is correlated to a transit time, communications delay, or propagation delay of communications over wireless link 120.

WCD 130 processes the first delay metric to determine if the first delay metric exceeds a threshold delay. The threshold delay could be determined based upon many different factors, depending upon the intentions of the operator of communication network 100. For example, the threshold delay could indicate a maximum protocol timing period allowed by the provisions of a particular communication protocol. In other examples, the threshold delay could be a maximum protocol timing period while accounting for a tolerance or margin factor. The threshold delay could also be representative of a physical distance, as correlated to a communication delay over a wireless link, such as a wireless coverage radius of access node 110, a communication range of WCD 130, or other phenomena.

If the first delay metric does not exceed the threshold delay, communications between access node 110 and WCD 130 over wireless link 120 are timed based on the first delay metric. In examples where the first delay metric does not exceed the threshold delay, it may be determined that no further action be taken by WCD 130, as the delays associated with wireless link 120 are within the provisions of the communications protocol employed.

However, if the first delay metric exceeds the threshold delay, the first delay metric and a protocol timing period are processed to determine a second delay metric, where the second delay metric indicates a second time delay less than the protocol timing period. At least one of the protocol timing periods is processed to add to the second delay metric to determine a third delay metric, wherein the third delay metric comprises the second delay metric and at least one of the protocol timing periods.

In many example communication protocols, a maximum time delay provision is allowed between two points in a communication link, and can be a limited by the particular communication protocol employed, among other factors. This time delay provision can limit the maximum distance, interconnect quality, number of repeaters, number and delay of interconnecting equipment, or operating speed of two points in a communication link.

In examples where the transmission delay becomes too large to be accommodated by the limitations of the communication protocol, the third delay metric could include both a timing offset within the individual elements of the communications as well as a delay in total communications In some examples, the timing offset of the individual elements, referred to above as the second delay metric, includes a timing offset to delay transmission of portions by time periods less than timing periods of the communication protocol, which could reach a maximum allowable timing offset dictated by the communications protocol employed. The delay in total communications could include at least one protocol timing period, such as a symbol or frame, by which to adjust the timing in communications. This delay in total communications could indicate a delay in communications, or a delayed expectation or receipt of communications. A further discussion of the protocol timing offset is found below in FIGS. 8A/8B within the context of a ranging process of a wireless communication protocol.

Once the third delay metric has been determined, WCD 130 times further communications with access node 110 based upon the third delay metric. These further communications could include a ranging process of wireless link 120 to adjust the communication timing, power, frequency tuning, burst profile, or other parameters of communications of access node 110 with WCD 130. This ranging process could include ranging messages or ranging channels; CDMA, OFDM or OFDMA frames or symbols; or other communication and ranging elements.

The wireless link ranging phase includes a second communication group exchanged between access node 110 and WCD 130 over wireless link 120. In some examples, a portion of the second communication group is transferred from WCD 130 to access node 110, and another portion of the second communication group is transferred from access node 110 to WCD 130.

The wireless link ranging phase example shown in FIG. 6 includes a ranging message as part of an initial ranging process. In examples of initial ranging, WCD 130 initiates transfer of a portion of the second communication group when initializing communications with access node 110. This wireless link ranging phase begins with an initial ranging message being transferred from WCD 130 to access node 110 over wireless link 120. This initial ranging message could be initiated when WCD 130 desires to initiate communications with access node 110 and, in some examples, transferred after WCD 130 monitors control and status communications periodically broadcast by access node 110. In some WiMAX examples, the initial ranging message could also be transferred in response to a reference symbol or signal timing determined by access node 110. In other examples, this ranging message is part of an invited or periodic ranging procedure instead initiated by access node 110.

To ensure proper communications with access node 110, WCD 130 could transfer the ranging message early. Since the first delay metric may exceed the threshold delay, communications (including the ranging message) transferred by WCD 130 over wireless link 120 would experience excessive delays and be received by access node 110 at a delay time. By determining the second delay metric and the at least one protocol timing periods which comprise the third delay metric, WCD 130 could then transfer communications to access node 110 at an earlier time, compensating for the excessive delay of wireless link 120. It should be noted that transferring communications at least one protocol timing periods early is not a part of the communication protocol employed over wireless link 120. Instead, the second delay metric would normally be the delay that fits within the provisions of the particular communications protocol. This second delay metric could be used to further time communications with access node 110.

In response to the ranging message, access node 110 could send a ranging message response. This ranging message response could include further information to adjust the communication timing, power, frequency tuning, burst profile, or other parameters of communications of access node 110 with WCD 130.

Figure 7:
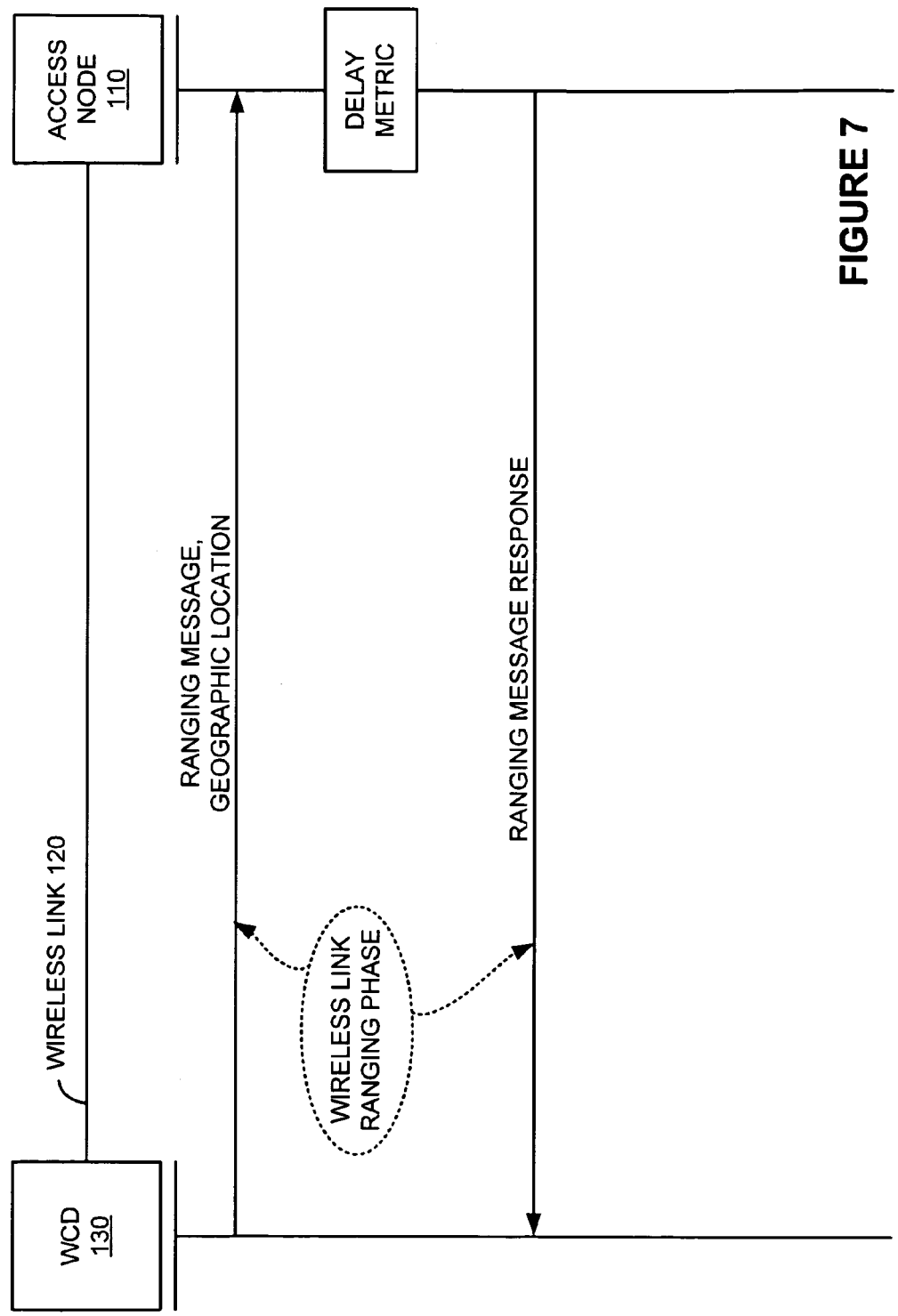
FIG. 7 is a sequence diagram illustrating a method of operation of a communication system.

FIG. 7 is a sequence diagram that shows an example sequence of operation of communication system 100, as found in FIG. 1. In FIG. 7, a wireless link ranging phase is shown. In this example, access node 110 determines the proper timing for communications over wireless link 120.

A first communication group is transferred to access node 110 by WCD 130 over wireless link 120. This first communication group could include a ranging process to adjust the communication timing, power, frequency tuning, burst profile, or other parameters of communications of access node 110 with WCD 130 over wireless link 120. This ranging process could include ranging messages or ranging channels; CDMA, OFDM or OFDMA frames or symbols; or other communication and ranging elements. In this example, a portion of the first communication group is transferred from WCD 130 to access node 110, and another portion of the first communication group is transferred from access node 110 to WCD 130.

The wireless link ranging phase example shown in FIG. 7 includes a ranging message as part of an initial ranging process. In examples of initial ranging, WCD 130 initiates transfer of a portion of the first communication group when initializing communications with access node 110. This wireless link ranging phase begins with an initial ranging message being transferred from WCD 130 to access node 110 over wireless link 120. This initial ranging message could be initiated when WCD 130 desires to initiate communications with access node 110 and, in some examples, transferred after WCD 130 monitors control and status communications periodically broadcast by access node 110. In some WiMAX examples, the initial ranging message could also be transferred in response to a reference symbol or signal timing determined by access node 110. In other examples, this ranging message is part of an invited or periodic ranging procedure instead initiated by access node 110.

In addition to the ranging message, information relating to a geographic location of WCD 130 is received by access node 110. In some examples, WCD 130 includes wireless device location system 140, determines this location information, and transfers it over wireless link 120 to access node 110. In other examples, access node 110 receives information relating to a geographic location of WCD 130 from wireless device location system 140 over link 111. Wireless device location system 140 could include equipment to triangulate a geographic position of WCD 130, or may be a global-positioning system (GPS), a terrestrial position determining equipment (PDE) system, an emergency services location procedure system, or some other type of location determining system, including combinations thereof.

Location information relating to a geographic location of access node 110 is also received by access node 110. Access node 110 could determine this location information in a similar fashion as wireless device location system 140. In examples where the geographic location of access node 110 does not change, the location information relating to the geographic location of access node 110 could be predetermined and stored by access node 110 for later access.

Access node 110 then processes the location information of access node 110 and WCD 130 to determine a distance between access node 110 and WCD 130. Access node 110 processes the distance to determine a first delay metric associated with wireless link 120. Wireless signals transferred over wireless link 120 typically follow paths through air, space, or some other wireless transport medium which can be estimated or approximated. The distance can be processed to determine a first delay metric, where the first delay metric indicates a first time delay associated with wireless link 120. This first time delay is correlated to a transit time, communications delay, or propagation delay of communications over wireless link 120.

Access node 110 processes the first delay metric to determine if the first delay metric exceeds a threshold delay. The threshold delay could be determined based upon many different factors, depending upon the intentions of the operator of communication network 100. For example, the threshold delay could indicate a maximum protocol timing period allowed by the provisions of a particular communication protocol. In other examples, the threshold delay could be a maximum protocol timing period while accounting for a tolerance or margin factor. The threshold delay could also be representative of a physical distance, as correlated to a communication delay over a wireless link, such as a wireless coverage radius of access node 110, a communication range of WCD 130, or other phenomena.

If the first delay metric does not exceed the threshold delay, communications between access node 110 and wireless communication device 130 over wireless link 120 are timed based on the first delay metric. In examples where the first delay metric does not exceed the threshold delay, a ranging message response could then be sent to WCD 130. This ranging message response could include further information to adjust the communication timing based upon the first delay metric, power, frequency tuning, burst profile, or other parameters of communications of access node 110 with WCD 130. This ranging response message could then be handled within the normal operations of the communication protocol, as the delays associated with wireless link 120 are within the provisions of the communications protocol employed.

However, if the first delay metric exceeds the threshold delay, the first delay metric and a protocol timing period are processed to determine a second delay metric, where the second delay metric indicates a second time delay less than the protocol timing period. At least one of the protocol timing periods is processed to add to the second delay metric to determine a third delay metric, wherein the third delay metric comprises the second delay metric and at least one of the protocol timing periods.

In many example communication protocols, a maximum time delay provision is allowed between two points in a communication link, and can be a limited by the particular communication protocol employed, among other factors. This time delay provision can limit the maximum distance, interconnect quality, number of repeaters, number and delay of interconnecting equipment, or operating speed of two points in a communication link.

In examples where the transmission delay becomes too large to be accommodated by the limitations of the communication protocol, the third delay metric could include both a timing offset within the individual elements of the communications as well as a delay in total communications In some examples, the timing offset of the individual elements, referred to above as the second delay metric, includes a timing offset to delay transmission of elements by time periods less than timing periods of the communication protocol, which could reach a maximum allowable timing offset dictated by the communications protocol employed. The delay in total communications could include at least one protocol timing periods, such as symbols or frames, by which to adjust the timing in communications. This delay in total communications could indicate a delay in communications, or a delayed expectation or receipt of communications. A further discussion of the protocol timing offset is found below in FIGS. 8A/8B within the context of a ranging process of a wireless communication protocol.

Once the third delay metric has been determined, access node 110 times further communications with WCD 130 based upon the third delay metric. These further communications could include a ranging response message over wireless link 120 to adjust the communication timing, power, frequency tuning, burst profile, or other parameters of communications of access node 110 with WCD 130. The further communications could also comprise user communications, including voice, data, or other communication content.

The third delay metric could include both a timing offset within the individual elements of the communications as well as a delay in total communications In some examples, the timing offset of the individual elements includes a timing offset to delay transmission of portions (such as symbols or possibly frames) of the communication protocol, which could reach a maximum allowable timing offset as discussed herein. The delay in total communications could include an integer number of symbols or frames by which to adjust the timing in communications. This timing adjustment could further indicate a delay in communications or a delayed receipt of communications.

In operation of communication system 100, WCD 130 and access node 110 exchange user communications over wireless link 120. During this user communications exchange, communication system 100 desires to provide reliable user communications which have proper timing and synchronization. Advantageously, by utilizing a method of operation, as described herein, to adjust the timing of user communications of communication system 100, systems with large delays that exceed the provisions of the communication protocols can communicate effectively. This allows wireless communication devices to be more remotely located or communicate over links with larger delays than acceptable by the limitations of certain communication protocols. Also, by way of advantage, when many wireless communication devices are communicating with an access node, interferences, collisions, or other malfunctions of the communications are reduced or prevented.

FIGS. 8A and 8B illustrate a ranging process of a wireless communication protocol under two delay scenarios, a short delay example in FIG. 8A and a long delay example in FIG. 8B. Further examples of the ranging process are illustrated above in FIG. 6 and FIG. 7. During operation of a communication system, in many examples, a ranging process is typically employed to adjust the delays, timing, power, frequency tuning, burst profile, or other parameters of communications between an access node and a wireless communication device over a wireless link. This ranging process could include ranging messages or ranging channels; OFDM, OFDMA, or CDMA frames or symbols; or other communication and ranging elements.

This ranging process could be, for example, an initial ranging process, an invited ranging process, or a periodic ranging process. In examples of initial ranging, a wireless communication device initiates transfer of a portion of the communications when initializing communications with an access node. In examples of invited ranging, a portion of the communications transferred from a wireless communication device to an access node could be triggered when a portion transferred from the access node is received at the wireless communication device. In other examples of invited ranging, a wireless communication device processes a portion of the communications received from an access node to determine the content and timing of the portion transferred to the access node. In examples of periodic ranging, the ranging process is conducted on a timed or regular basis, initiated when a portion of the communications is transferred to a wireless communication device or by way of a timing mechanism internal to an access node to initiate the ranging process after a certain period of time.

FIG. 8A provides a graphical representation of ranging message 810A between access node 110 of FIG. 5 and WCD 531 associated with access node 110 over wireless link 521, assuming for this example, a short delay. In FIG. 8A, the ranging process is facilitated by a continual series of reference symbols, four of which are explicitly shown, 801R1-801R4. Each reference symbol 801R1-801R4 is encountered serially, with each reference symbol 801R1-801R4 representing a predetermined period of time.

In FIG. 8A, WCD 531 when initiating communication with access node 110 over a short example of a wireless link, for example, would monitor the series of reference symbols transferred by access node 110. An example of a short link is illustrated in FIG. 5 by wireless link 521 with a distance less than radius 561. In response to a particular reference symbol, 801R1, the wireless communication device 531 transfers a ranging message 810A. Short delays in wireless link 521 between access node 110 and WCD 531 would delay the receipt of reference symbol 801R1 (transferred by access node 110) in WCD 531 and likewise delay the receipt of ranging message 810A (transferred by WCD 531) in access node 110. This is represented by communication delay 820TA. Communication delay 820TA is an amount of time by which ranging message 810A is delayed in arrival at access node 110 with regards to the transfer of reference symbol 801R1. Since ranging message 810A arrives at access node 110 within the period of reference symbol 801R1, access node 110 properly receives ranging message 810A and correlates ranging message 810A with reference symbol 801R1.

To help compensate for communication delay 820TA, access node 110 could adjust the timing of communications with wireless communications device 531 by processing communication delay 820TA. However, access node 110 would be limited in this adjustment by the timing offset provisions of the particular protocol used, and thus only a short communications delay would be acceptable. In some examples, this timing offset could be transferred to WCD 531 and used to delay communications with access node 110. As shown in FIG. 5, radius 561 could represent a distance or length of a wireless link at the maximum communications delay based upon the particular protocol employed in wireless communications with access node 110.

FIG. 8B provides a graphical representation of ranging message 810B between access node 110 of FIG. 5 and WCD 130 associated with access node 110 over wireless link 120, assuming for this example, a long delay such as found in radius 560. An example of a long delay is illustrated in FIG. 5 by wireless link 120 with a distance greater than radius 561. In FIG. 8B, the ranging process is facilitated by a continual series of reference symbols, four of which are explicitly shown, 802R1-802R4. Each reference symbol 802R1-802R4 is encountered serially, with each reference symbol 802R1-802R4 representing a predetermined period of time.

In FIG. 8B, WCD 130 initiating communication with access node 110, for example, would monitor the series of reference symbols transferred by access node 110. In response to a particular reference symbol, 802R1, WCD 130 transfers ranging message 810B. Long delays in wireless link 120 between access node 110 and WCD 130 would delay the receipt of reference symbol 802R1 (transferred by access node 110) in WCD 130 and likewise delay the receipt of ranging message 810B (transferred by WCD 130) in access node 110. This is represented by communication delay 820TB, an amount of time by which ranging message 810B is delayed in arrival at access node 110. However, unlike in FIG. 8A, ranging message 810B does not arrive at access node 110 within the period of one reference symbol 802R1, and access node 110 would not properly correlate ranging message 810B with reference symbol 802R1. Instead, ranging message 810B arrives at access node 110 within the time period of reference symbol 802R2. This can lead to confusion on which reference symbol is correlated with ranging packet 810B, further leading to interference, collision, or malfunction of other ranging packets on similar channels, as well as make access node 110 believe that ranging message 810B is correlated with a different reference symbol, for example reference symbol 802R2, instead of 802R1.

In the above discussions on delay, it should be understood that a 'short' delay would be a delay acceptable by the timing offset provisions of the particular communications protocol, while a 'long' delay would be a delay exceeding the timing offset limitations of the communication protocol.

In some examples of the third delay metric, as discussed herein, if the delays found in wireless link 120 are greater than limits within the timing provisions of the communication protocol, access node 110 could correlate a different reference symbol to the communications received in access node 110 from WCD 130. In such examples, the particular reference symbol could be determined by processing the delays associated with wireless link 120 over which WCD 130 and access node 110 communicate. This processing could also be done in view of the timing offset limitations of the particular protocol to adjust the timing of communications over wireless link 120.

In an example, if the communication delay of a ranging packet sent by WCD 130 exceeds a fraction of the timing offset provisions of the communication protocol, then a later reference symbol could be correlated to the communications with WCD 130. A two-part delay metric could then be determined, with a first part being a portion of the communication delay attributed to the later reference symbol, and a second part being a portion of the communication delay attributed to the remaining timing offset not exceeding the above fraction of the timing offset provision of the communication protocol. In some examples, the fraction could be one-half (½) of the timing offset provisions of the communication protocol. Furthermore, in some examples, the first part of the two-part delay metric could be utilized by access node 110 to adjust the expectation time of arrival of communications from WCD 130, and the second part of the two-part delay could be transferred to WCD 130 and used to delay communications transferred to access node 110. In other examples, different configurations of the delay metric could be utilized.

Figure 9:
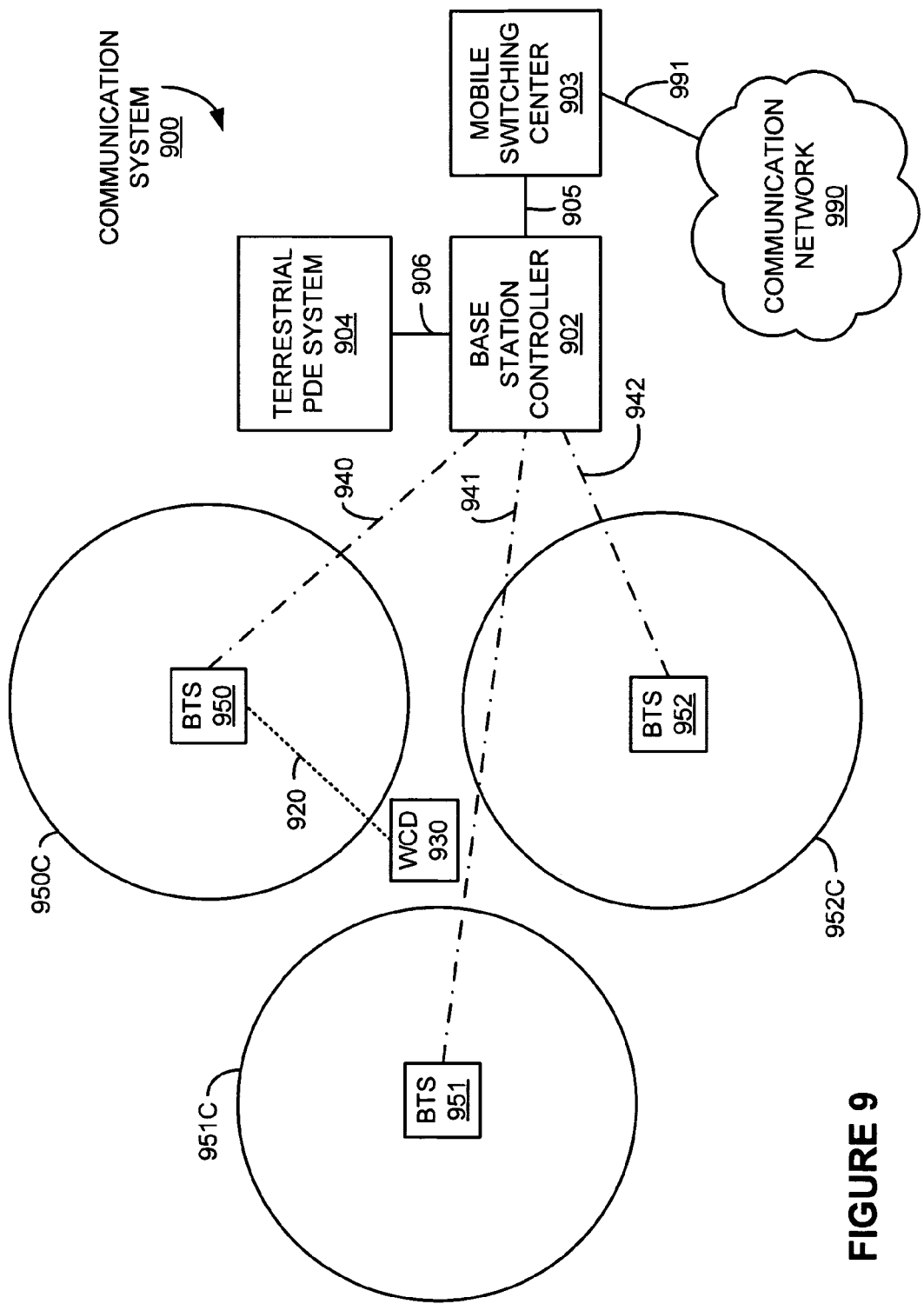
FIG. 9 is a system diagram illustrating a communication system.

FIG. 9 is a system diagram illustrating communication system 900. FIG. 9 includes wireless communication device (WCD) 930, base transceiver stations (BTS) 950-952, base station controller 902, mobile switching center 903, terrestrial position determining equipment (PDE) system 904, and communication network 990. Wireless communication device 930 and BTS 950 communicate over wireless link 920. BTS 950 has wireless coverage area 950C. BTS 951 has wireless coverage area 951C. BTS 952 has wireless coverage area 952C. BTS 950 and base station controller 902 communicate over link 940. BTS 951 and base station controller 902 communicate over link 941. BTS 952 and base station controller 902 communicate over link 942. Base station controller 902 and mobile switching center 903 communicate over link 905. Base station controller 902 and terrestrial position determining equipment (PDE) system communicate over link 906. Mobile switching center 903 and communication network 990 communicate over link 991.

Wireless communication device 930 comprises a telephone, transceiver, computer, digital assistant, Internet appliance, smart phone, or some other wireless communication apparatus, including combinations thereof.

BTS 950-952 include equipment for communicating and controlling WCD 930. BTS 950-952 could also include other types of communications network equipment capable of communicating with WCD 930.

Base station controller 902 includes equipment for communicating with and controlling BTS 950-952. Base station controller 902 could also include other types of communications network equipment capable of communicating with BTS 950-952.

Mobile switching center 903 includes equipment for communicating with and controlling base station controller 902, as well as possibly other base station controllers not shown in FIG. 9. Mobile switching center 903 could also include other types of communications network equipment capable of communicating with base station controller 902. Examples include radio node controllers (RNC), authorization and accounting (AAA) equipment, telephone switches, routers, gateways, as well as other type of communication equipment, including combinations thereof.

In some examples, base station controller 902 is configured to monitor and control the operations of BTS 950-952, and mobile switching center 903 is configured to monitor and control the operations of base station controller 902. In other examples, the various elements of communication system 900 could operate more autonomously, mainly exchanging communications.

Communication network 990 comprises further communication systems, such as an Internet network, other wireless networks, or telephony networks.

Terrestrial position determining equipment (PDE) system 904 includes equipment capable of determining an indicator related to a geographic position of wireless communication devices in communication system 900. In some examples, it determines this by a triangulation method by monitoring wireless signal strengths of wireless communication devices across several base transceiver stations. Terrestrial position determining equipment (PDE) system 904 also includes equipment to transfer indicators related to geographic positions of wireless communication devices. In some configurations of communication system 900, terrestrial position determining equipment (PDE) system 904 instead communicates with mobile switching center 903 or with BTS 950-952.

Links 905, 906, 940-942, and 991 use various communication media, such as air, space, metal, optical fiber, or some other signal propagation path—including combinations thereof. Links 905, 906, 940-942, and 991 could be wired or wireless and use various protocols. Links 905, 906, 940-942, and 991 could be direct links or it might include various equipment, intermediate components, systems, and networks.

Wireless link 920 could use various communication media, such as air, space, or some other wireless transport media—including combinations thereof. Wireless link 920 could use various protocols, such as code division multiple access (CDMA), worldwide interoperability for microwave access (WiMAX), or other communication protocols. Wireless link 920 may comprise many different signals sharing the same link. A wireless link could include multiple signals operating in a single "airpath"—as represented by the dashed line of wireless link 920 in FIG. 9—comprising multiple frequencies, timeslots, packets, or communication directions. For example, communications and control signals between WCD 930 and base BTS 950 could share the same wireless link 920, but be transferred over different frequencies, timeslots, packets, or in different directions—including combinations thereof.

FIG. 9 shows wireless coverage areas 950C-952C. A wireless coverage area can represent a particular region of wireless coverage in which wireless communication devices are located. In many examples, a wireless coverage area is served by a one or more antennas, an antenna tower, or one or more base transceiver stations. Wireless communication devices can be located throughout FIG. 9, both inside and outside of the wireless coverage areas. Although only WCD 930 is shown in FIG. 9 for clarity and simplicity, it should be understood that in various examples of communication system 900, many wireless communication devices could be located in and distributed throughout the various wireless coverage areas. The wireless communication devices are configured to communicate with BTS 950-952, base station controller 902, mobile switching center 903, communication network 990, and similarly, each other by way of communication system 900.

Communication system 900 includes BTS 950-952 each within a separate circular region of coverage, although in some examples a different number or configuration of base transceiver stations may be included. The circular shape should be understood to be merely representative of an overhead view of a region of wireless coverage, and should not be interpreted as an exact physical representation of such a region.

Wireless coverage areas can be defined via many different parameters. These parameters may include signal strength, geographic features surrounding a BTS, or limitations of the communication protocol employed over wireless links serving the wireless coverage area. In this example, coverage areas 950C-952C are defined by the limitations of the communications protocol employed, for example, WiMAX. In this manner, wireless communication devices located at too great a distance from a BTS will not typically be able to establish proper communication with the BTS, and are considered outside of the wireless coverage areas served by a particular BTS.

In operation of communication system 900, communication system 900 exchanges communications between wireless communication devices as well as communication network 990. During this communications exchange, a wireless communication device exchanges user communications primarily with one base transceiver station. In addition to the user communications with a specific BTS, a wireless communication device also is able to be monitored by other base transceiver stations in communication system 900. In this example, BTS 950 determines the proper timing for communications with WCD 930 over wireless link 920.

WCD 930 initiates transfer of a portion of an initial ranging communication group when initializing communications with BTS 950 over wireless link 920. This initial ranging begins with an initial ranging message being transferred from WCD 930 to BTS 950 over wireless link 920. The ranging process is used to adjust the communication timing, power, frequency tuning, burst profile, or other parameters of communications of BTS 950 with WCD 930 over wireless link 920. This initial ranging message could be initiated when WCD 930 desires to initiate communications with BTS 950 and, in some examples, transferred after WCD 930 monitors control and status communications periodically broadcast by BTS 950. In some WiMAX examples, the initial ranging message could also be transferred in response to a reference symbol or signal timing transferred by BTS 950.

Additionally, an indicator relating to a geographic location of WCD 930 is received by BTS 950. Terrestrial PDE system 904 determines an indicator related to a geographic position of WCD 930 by way of triangulation. BTS 950-952 monitor the transmissions of WCD 930 and are configured to transfer to base station controller 902 information related to the signal strength of the transmissions of WCD 930 as detected by BTS 950-952. Terrestrial PDE system 904 then processes the information related to the signal strength of the transmissions of WCD 930 as detected by BTS 950-952 to determine an indicator of a geographic location of WCD 930. Once this information has been processed by terrestrial PDE system 904, the indicator is transferred to BTS 950 by way of base station controller 902.

Location information relating to a geographic location of BTS 950 is also received by BTS 950. BTS 950 could receive this location information in a similar fashion by way of terrestrial PDE system 904. However, in this example, the geographic location of BTS 950 does not change, and the location information relating to the geographic location of BTS 950 could be predetermined and stored for later access.

BTS 950 then processes the location information of both BTS 950 and WCD 930 to determine a distance between BTS 950 and WCD 930. BTS 950 processes the distance to determine a first delay metric associated with wireless link 920. Wireless signals transferred over wireless link 920 typically follow paths through air, space, or some other wireless transport medium which can be estimated or approximated. The distance can be processed to determine a first delay metric, where the first delay metric indicates a first time delay associated with wireless link 920. This first time delay is correlated to a transit time, communications delay, or propagation delay of communications over wireless link 920.

BTS 950 processes the first delay metric to determine if the first delay metric exceeds a threshold delay. The threshold delay could be determined based upon many different factors, depending upon the intentions of the operator of communication network 900. In this example, the threshold delay indicates a maximum protocol timing period allowed by the provisions of the particular wireless communication protocol employed.

As shown in FIG. 9, WCD 930 is located outside of wireless coverage area 950C (and likewise outside of wireless coverage areas 951C and 952C), and therefore the first delay metric would exceed the threshold delay since coverage area 950C has been defined, in this example, according to the limitations of the wireless communication protocol employed.

The first delay metric and a protocol timing period are processed to determine a second delay metric, where the second delay metric indicates a second time delay less than the protocol timing period. At least one of the protocol timing periods is processed to add to the second delay metric to determine a third delay metric, wherein the third delay metric comprises the second delay metric and at least one of the protocol timing periods.

Regarding the protocol timing period, in many example communication protocols a maximum time delay provision is allowed between two points in a communication link, and can be a limited by the particular communication protocol employed, among other factors. This time delay provision can limit the maximum distance between two points in a communication link.

Since, in this example, the transmission delay has become too large to be accommodated by the limitations of the communication protocol, the third delay metric includes both a timing offset within the individual elements of the communications as well as a delay in total communications.

The timing offset of the individual elements, referred to above as the second delay metric, includes a timing offset to delay transmission by time periods less than individual timing periods of the communication protocol, which reach a maximum allowable timing offset. In example protocols such as orthogonal frequency division multiplexing access (OFDMA) employed in some WiMAX communications, the second delay metric allows for intra-symbol timing, where the amount of timing adjustment cannot exceed one symbol period of time due to the limitations of the protocol.

The delay in total communications could include at least one of a number of protocol timing periods, such as symbols or frames, by which to adjust the timing in communications.

This delay in total communications could indicate a delay in communications, or a delayed expectation or receipt of communications, outside the limitations of the wireless communications protocol employed. For example, BTS 950 could use the delay comprising at least one protocol timing period to delay the expected time of arrival of communications in BTS 950 from WCD 930. In other examples, BTS 950 could transmit communications early to WCD 930 by a time comprising at least one protocol timing period. In some examples, the number of protocol timing periods used for delayed or early timing include only an integer quantity of protocol timing periods.

Once the third delay metric has been determined, BTS 950 times further communications with WCD 930 based upon the third delay metric. These further communications could include a ranging response message over wireless link 920 to adjust the communication timing, power, frequency tuning, burst profile, or other parameters of communications of BTS 950 with WCD 930. The further communications could also comprise user communications, including voice, data, or other communication content.

In operation of communication system 900, WCD 930 and communication network 990 exchange user communications by way of wireless link 920, BTS 950, base station controller 902, and mobile switching center 903. During this user communications exchange, communication system 900 desires to provide reliable user communications which have proper timing and synchronization over wireless link 920. Advantageously, by utilizing a method of operation, as described herein, to adjust the timing of user communications of WCD 930 over wireless link 920, systems with large delays that exceed the provisions of the communication protocols can communicate effectively. This allows wireless communication devices to be more remotely located or communicate over wireless links with larger delays than acceptable by the limitations of certain communication protocols. Also, by way of advantage, when many wireless communication devices are communicating with an access node, interferences, collisions, or other malfunctions of the communications are reduced or prevented.

Figure 10:
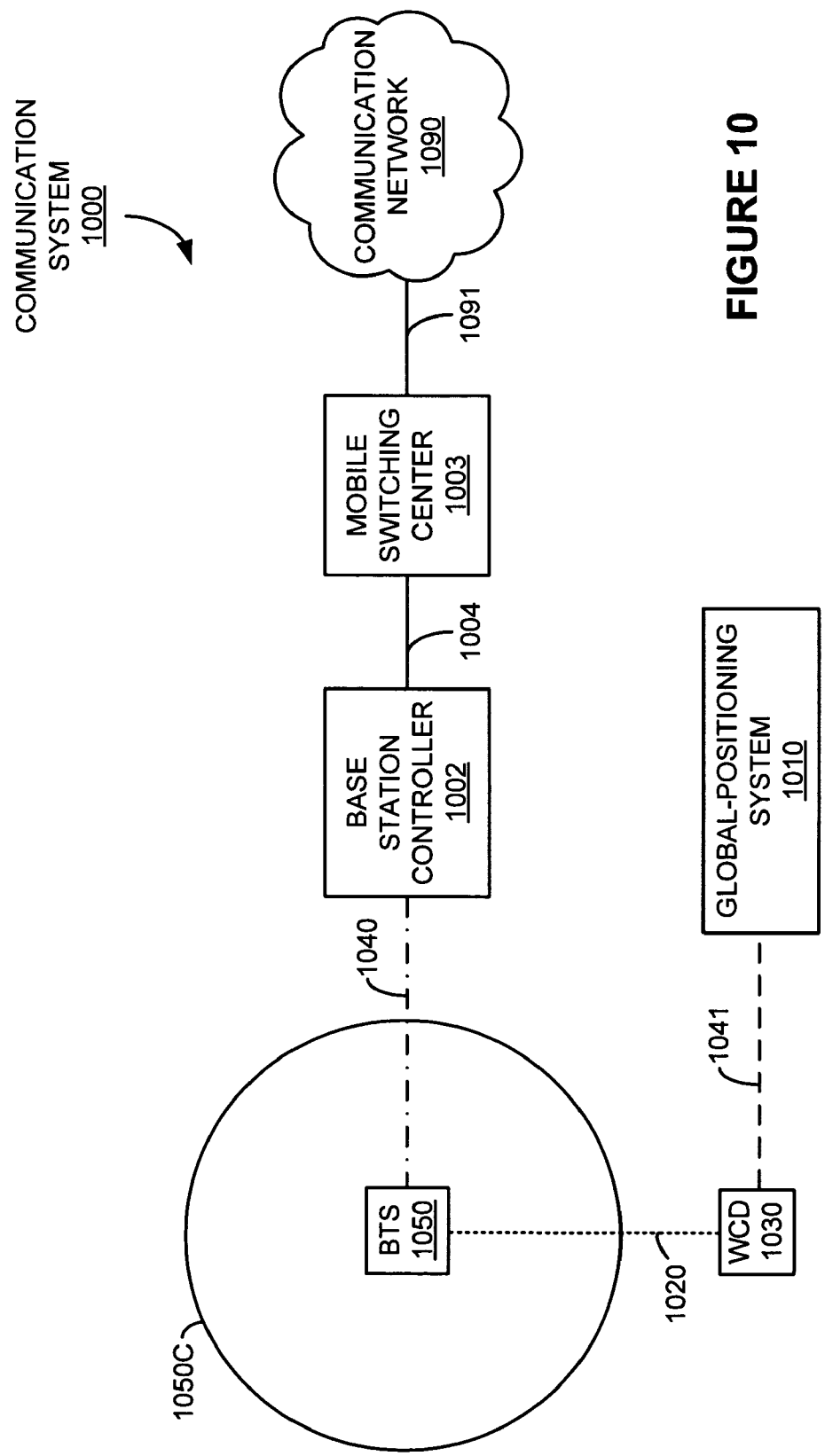
FIG. 10 is a system diagram illustrating a communication system.

FIG. 10 is a system diagram illustrating communication system 1000. FIG. 10 includes wireless communication device (WCD) 1030, base transceiver stations (BTS) 1050, base station controller 1002, mobile switching center 1003, global-positioning system (GPS) 1010, and communication network 1090. Wireless communication device 1030 and BTS 1050 communicate over wireless link 1020. BTS 1050 has wireless coverage area 1050C. BTS 1050 and base station controller 1002 communicate over link 1040. Base station controller 1002 and mobile switching center 1003 communicate over link 1004. WCD 1030 and GPS 1010 communicate over link 1041. Mobile switching center 1003 and communication network 1090 communicate over link 1091.

WCD 1030 comprises a telephone, transceiver, computer, digital assistant, Internet appliance, smart phone, or some other wireless communication apparatus, including combinations thereof.

BTS 1050 includes equipment for communicating and controlling WCD 1030. BTS 1050 could also include other types of communications network equipment capable of communicating with WCD 1030.

Base station controller 1002 includes equipment for communicating with and controlling BTS 1050. Base station controller 1002 could also include other types of communications network equipment capable of communicating with BTS 1050.

Mobile switching center 1003 includes equipment for communicating with and controlling base station controller 1002, as well as possibly other base station controllers not shown in FIG. 10. Mobile switching center 1003 could also include other types of communications network equipment capable of communicating with base station controller 1002. Examples include radio node controllers (RNC), authorization and accounting (AAA) equipment, telephone switches, routers, gateways, as well as other type of communication equipment, including combinations thereof.

In some examples, base station controller 1002 is configured to monitor and control the operations of BTS 1050, and mobile switching center 1003 is configured to monitor and control the operations of base station controller 1002. In other examples, the various elements of communication system 1000 could operate more autonomously, mainly exchanging communications.

Communication network 1090 comprises further communication systems, such as an Internet network, other wireless networks, or telephony networks.

GPS 1010 includes equipment capable of determining an indicator related to a geographic position of WCD 1030. In some examples, GPS 1010 comprises a satellite network system and link 1041 comprises several wireless links to several satellites. In other examples, some of the components of GPS 1010 are located within WCD 1030, and some are located externally.

Links 1004, 1040, 1041, and 991 use various communication media, such as air, space, metal, optical fiber, or some other signal propagation path—including combinations thereof. Links 1004, 1040, 1041, and 991 could be wired or wireless and use various protocols. Links 1004, 1040, 1041, and 991 could be direct links or it might include various equipment, intermediate components, systems, and networks.

Wireless link 1020 could use various communication media, such as air, space, or some other wireless transport media—including combinations thereof. Wireless link 1020 could use various protocols, such as code division multiple access (CDMA), worldwide interoperability for microwave access (WiMAX), or other communication protocols. Wireless link 1020 may comprise many different signals sharing the same link. A wireless link could include multiple signals operating in a single "airpath"—as represented by the dashed line in FIG. 10—comprising multiple frequencies, timeslots, packets, or communication directions. For example, communications and control signals between WCD 1030 and base BTS 1050 could share the same wireless link 1020, but be transferred over different frequencies, timeslots, packets, or in different directions—including combinations thereof.

FIG. 10 shows wireless coverage area 1050C representing a particular region of wireless coverage in which wireless communication devices are located. Although only WCD 1030 is shown in FIG. 10 for clarity and simplicity, it should be understood that in various examples of communication system 1000, many wireless communication devices could be located in and distributed throughout communication system 1000. The wireless communication devices are configured to communicate with BTS 1050, base station controller 1002, mobile switching center 1003, communication network 1090, and similarly, each other by way of communication system 1000.

Communication system 1000 includes BTS 1050 situated in a circular region of coverage, although in some examples a different number or configuration of base transceiver stations may be included. The circular shape should be understood to be merely representative of an overhead view of a region of wireless coverage, and should not be interpreted as an exact physical representation of such a region.

In this example, coverage area 1050C is defined by the limitations of the communications protocol employed, for example, WiMAX. In this manner, wireless communication devices located at too great a distance from BTS 1050 will not typically be able to establish proper communication with BTS 1050, and are considered outside of the wireless coverage area.

In operation of communication system 1000, communication system 1000 exchanges communications between wireless communication devices as well as communication network 1090. During this communications exchange, WCD 1030 exchanges user communications with BTS 1050 over wireless link 1020. In this example, WCD 1030 determines the proper timing for communications over wireless link 1020.

The location information relating to the geographic location of WCD 1030 is determined by GPS 1010, and transferred over link 1041 to WCD 1030. The location information is then received by WCD 1030.

WCD 1030 initiates transfer of a portion of an initial ranging communication group when initializing communications with BTS 1050 over wireless link 1020. This initial ranging begins with an initial ranging message being transferred from WCD 1030 to BTS 1050 over wireless link 1020. The ranging process is used to adjust the communication timing, power, frequency tuning, burst profile, or other parameters of communications of BTS 1050 with WCD 1030 over wireless link 1020. This initial ranging message could be initiated when WCD 1030 desires to initiate communications with BTS 1050 and, in some examples, transferred after WCD 1030 monitors control and status communications periodically broadcast by BTS 1050. In some WiMAX examples, the initial ranging message could also be transferred in response to a reference symbol, signal timing, pilot signal, pilot beacon, or a beacon signal transferred by BTS 1050.

In this example, an indicator of the geographic location of BTS 1050 is transferred to WCD 1030 over wireless link 1020. Location information relating to a geographic location of BTS 1050 is then received by WCD 1030. BTS 1050 could determine this location information from a global-positioning system (GPS), a terrestrial position determining equipment (PDE) system, a triangulation-based location system, an emergency services location procedure system, or some other type of location determining system as discussed herein, including combinations thereof. In examples where the geographic location of BTS 1050 does not change, the location information relating to the geographic location of BTS 1050 could be predetermined and stored by BTS 1050 or WCD 1030 for later access. This indicator of the geographic location of BTS 1050 could be broadcast so that all wireless communication devices desiring to establish communications with BTS 1050 can receive it. In some examples, the indicator of the geographic location of BTS 1050 is transferred over the pilot signal, pilot beacon, or beacon signal broadcast by BTS 1050. In other examples, the indicator of the geographic location of BTS 1050 could be transferred after requested by WCD 1030.

WCD 1030 then processes the location information of BTS 1050 and WCD 1030 to determine a distance between BTS 1050 and WCD 1030. WCD 1030 processes the distance to determine a first delay metric associated with wireless link 1020. Wireless signals transferred over wireless link 1020 typically follow paths through air, space, or some other wireless transport medium which can be estimated or approximated. The distance can be processed to determine a first delay metric, where the first delay metric indicates a first time delay associated with wireless link 1020. This first time delay is correlated to a transit time, communications delay, or propagation delay of communications over wireless link 1020.

BTS 1050 processes the first delay metric to determine if the first delay metric exceeds a threshold delay. The threshold delay could be determined based upon many different factors, depending upon the intentions of the operator of communication network 1000. In this example, the threshold delay indicates a maximum protocol timing period allowed by the provisions of the particular wireless communication protocol employed.

As shown in FIG. 10, WCD 1030 is located outside of wireless coverage area 1050C, and therefore the first delay metric would exceed the threshold delay since coverage area 1050C has been defined, in this example, according to the limitations of the wireless communication protocol employed.

The first delay metric and a protocol timing period are processed to determine a second delay metric, where the second delay metric indicates a second time delay less than the protocol timing period. At least one of the protocol timing periods is processed to add to the second delay metric to determine a third delay metric, wherein the third delay metric comprises the second delay metric and at least one of the protocol timing periods.

Regarding the protocol timing period, in many example communication protocols a maximum time delay provision is allowed between two points in a communication link, and can be a limited by the particular communication protocol employed, among other factors. This time delay provision can limit the maximum distance, interconnect quality, number of repeaters, number and delay of interconnecting equipment, or operating speed of two points in a communication link. Since, in this example, the transmission delay has become too large to be accommodated by the limitations of the communication protocol, the third delay metric includes both a timing offset within the individual elements of the communications as well as a delay in total communications.

The timing offset of the individual elements, referred to above as the second delay metric, includes a timing offset to delay transmission by time periods less than individual timing periods of the communication protocol, which reach a maximum allowable timing offset. In example protocols such as orthogonal frequency division multiplexing access (OFDMA) employed in some WiMAX communications, the second delay metric allows for intra-symbol timing of a reference symbol, where the amount of timing adjustment cannot exceed one symbol period of time due to the limitations of the protocol.

The delay in total communications could include at least one of a number of protocol timing periods, such as symbols or frames, by which to adjust the timing in communications. This delay in total communications could indicate a delay in communications, or a delayed expectation or receipt of communications, outside the limitations of the wireless communications protocol employed. To ensure proper communications with BTS 1050, WCD 1030 could transfer the ranging message early. Since the first delay metric may exceed the threshold delay, communications (including the ranging message) transferred by WCD 1030 over wireless link 1020 would experience excessive delays and be received by BTS 1050 at a delayed time. By determining the second delay metric and the at least one protocol timing periods which comprise the third delay metric, WCD 1030 could then transfer ranging and subsequent user communications to BTS 1050 at an earlier time, compensating for the excessive delay of wireless link 1020. It should be noted that transferring communications at least one protocol timing periods early is not a part of the communication protocol employed over wireless link 1020. Instead, the second delay metric would fit within the provisions of the particular communications protocol. This second delay metric could be used to further time communications with BTS 1050.

In response to the ranging message, BTS 1050 could send a ranging message response. This ranging message response could include further information to adjust the communication timing, power, frequency tuning, burst profile, or other parameters of communications of BTS 1050 with WCD 1030.

In operation of communication system 1000, WCD 1030 and communication network 1090 exchange user communications by way of wireless link 1020, BTS 1050, base station controller 1002, and mobile switching center 1003. During this user communications exchange, communication system 1000 desires to provide reliable user communications which have proper timing and synchronization over wireless link 1020. Advantageously, by utilizing a method of operation, as described herein, to adjust the timing of user communications of WCD 1030 over wireless link 1020, systems with large delays that exceed the provisions of the communication protocols can communicate effectively. This allows wireless communication devices to be more remotely located or communicate over wireless links with larger delays than acceptable by the limitations of certain communication protocols. Also, by way of advantage, when many wireless communication devices are communicating with an access node, interferences, collisions, or other malfunctions of the communications are reduced or prevented.

FIGS. 1-10 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:
receiving a first location information related to a geographic location of a wireless communication device and a second location information related to a geographic location of an access node;
processing the first location information and the second location information to determine a distance between the wireless communication device and the access node;
processing the distance to determine a first delay metric, wherein the first delay metric indicates a first time delay associated with a wireless link between the access node and the wireless communication device;
processing the first delay metric to determine if the first delay metric exceeds a threshold delay;
if the first delay metric exceeds the threshold delay, processing the first delay metric and a protocol timing period to determine a second delay metric, wherein the second delay metric indicates a second time delay less than the protocol timing period, and processing at least the protocol timing period to add to the second delay metric to determine a third delay metric, wherein the third delay metric comprises the second delay metric and at least the protocol timing period; and
timing communications between the access node and the wireless communication device over the wireless link based on the third delay metric.

2. The method of operating the communication system of claim 1, wherein the first location information related to the geographic location of the wireless communication device is received from a global-positioning system receiver.

3. The method of operating the communication system of claim 1, wherein the first location information related to the geographic location of the wireless communication device is received from a terrestrial position determining equipment system.

4. The method of operating the communication system of claim 1, wherein the second location information related to the geographic location of the access node is received from a global-positioning system.

5. The method of operating the communication system of claim 1, wherein the second location information related to the geographic location of the access node is received from a terrestrial position determining equipment system.

6. The method of operating the communication system of claim 1, further comprising:
in the access node, determining the second location information related to the geographic location of the access node, and transferring the second location information over the wireless link; and
in the wireless communication device, receiving the second location information.

7. The method of operating the communication system of claim 6, wherein the wireless link comprises a pilot beacon and wherein transferring the second location information over the wireless link comprises transferring the second location information over the pilot beacon in the wireless link.

8. The method of operating the communication system of claim 1, wherein the third delay metric comprises the second delay metric and an integer quantity of the protocol timing period.

9. The method of operating the communication system of claim 1, wherein the protocol timing period comprises a reference symbol for a WiMAX protocol.

10. A communication system, comprising:
a location system configured to determine a first location information related to a geographic location of a wireless communication device and transfer the first location information;
an access node configured to receive the first location information and determine a second location information related to a geographic location of the access node;
the access node configured to process the first location information and the second location information to determine a distance between the wireless communication device and the access node;
the access node configured to process the distance to determine a first delay metric, wherein the first delay metric indicates a first time delay associated with a wireless link between the access node and the wireless communication device;
the access node configured to process the first delay metric to determine if the first delay metric exceeds a threshold delay;
if the first delay metric exceeds the threshold delay, the access node configured to process the first delay metric and a protocol timing period to determine a second delay metric, wherein the second delay metric indicates a second time delay less than the protocol timing period, and process at least the protocol timing period to add to the second delay metric to determine a third delay metric, wherein the third delay metric comprises the second delay metric and at least the protocol timing period; and the access node configured to time communications between the access node and the wireless communication device over the wireless link based on the third delay metric.

11. The communication system of claim 10, wherein the location system comprises a global-positioning system; and the wireless communication device is configured to receive the first location information from the location system and transfer the location information over the wireless link.

12. The communication system of claim 10, wherein the location system comprises a position determining equipment system.

13. The communication system of claim 10, comprising:

the access node configured to transfer the second delay metric over the wireless link.

14. The communication system of claim 10, wherein the third delay metric comprises the second delay metric and an integer quantity of the protocol timing period.

15. The communication system of claim 10, wherein the protocol timing period comprises a reference symbol for a WiMAX protocol.

16. A communication device for a communication system, comprising:

a communication interface configured to receive a first location information related to a geographic location of the communication device and a second location information related to a geographic location of another communication device;

a processing system configured to process the first information and the second information to determine a distance between the communication device and the other communication device;

the processing system configured to process the distance to determine a first delay metric, wherein the first delay metric indicates a first time delay associated with a wireless link between the communication device and the other communication device;

the processing system configured to process the first delay metric to determine if the first delay metric exceeds a threshold delay;

if the first delay metric exceeds the threshold delay, the processing system configured to process the first delay metric and a protocol timing period to determine a second delay metric, wherein the second delay metric indicates a second time delay less than the protocol timing period, and process at least the protocol timing period to add to the second delay metric to determine a third delay metric, wherein the third delay metric comprises the second delay metric and at least the protocol timing period; and the communication interface configured to time communications between the communication device and the other communication device over the wireless link based on the third delay metric.

17. The communication device of claim 16, wherein the communication device comprises base station and the other communication device comprises a wireless communication device.

18. The communication device of claim 16, wherein the communication device comprises a wireless communication device and the other communication device comprises a base station.

19. The communication device of claim 16, wherein the third delay metric comprises the second delay metric and an integer quantity of the protocol timing period.

20. The communication device of claim 16, wherein the protocol timing period is a reference symbol for a WiMAX protocol.

* * * * *